United States Patent
Hartzell et al.

(10) Patent No.: US 11,668,108 B2
(45) Date of Patent: *Jun. 6, 2023

(54) INSULATION-RETAINING SHEET HAVING INTEGRAL VAPOR-RETARDING MEMBRANE

(71) Applicant: CertainTeed LLC, Malvern, PA (US)

(72) Inventors: Bruce A. Hartzell, Mickleton, NJ (US); John J. Bozek, Harleysville, PA (US); Michael J. Lembo, Souderton, PA (US); Valerio Massara, Redavalle (IT)

(73) Assignee: CertainTeed LLC, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,331

(22) Filed: Mar. 15, 2022

(65) Prior Publication Data

US 2022/0205256 A1    Jun. 30, 2022

Related U.S. Application Data

(63) Continuation of application No. 16/841,305, filed on Apr. 6, 2020, now Pat. No. 11,274,455, which is a
(Continued)

(51) Int. Cl.
*E04F 21/08* (2006.01)
*B32B 5/02* (2006.01)
(Continued)

(52) U.S. Cl.
CPC ............ *E04F 21/085* (2013.01); *B32B 5/028* (2013.01); *E04B 1/625* (2013.01); *B32B 2307/7246* (2013.01); *E04B 1/7604* (2013.01)

(58) Field of Classification Search
CPC .................. E04F 21/085; B32B 5/028; B32B 2307/7246; E04B 1/7604; E04B 1/625
See application file for complete search history.

(56) References Cited

U.S. PATENT DOCUMENTS

| 2,668,298 A | 2/1954 | Kimmons |
| 3,815,629 A | 6/1974 | Oberholtzer |

(Continued)

FOREIGN PATENT DOCUMENTS

| EP | 2431168 A1 | 3/2012 |
| JP | H07-072317 A | 3/1995 |

(Continued)

OTHER PUBLICATIONS

International Search Report and Written Opinion in PCT/US2018/052850, dated Jan. 17, 2019.

*Primary Examiner* — Andrew J Triggs
(74) *Attorney, Agent, or Firm* — McDonnell Boehnen Hulbert & Berghoff LLP

(57) ABSTRACT

The present disclosure relates generally to an insulation-retaining sheet, e.g., for blown-in insulation, that includes an integral vapor-retarding membrane. In one aspect, the disclosure provides an insulation-retaining sheet including a sheet of mesh having an air permeability of at least 200 cfm per square foot; and one or more strips of vapor-retarding membrane, the one or more strips of vapor-retarding membrane being laminated to the sheet of mesh, the first side edge each of the strips of vapor-retarding membrane extending to the first side edge of the sheet of mesh, the second side edge each of the strips of vapor-retarding membrane extending to the second side edge of the sheet of mesh, wherein the insulation-retaining sheet has a plurality of open zones extending laterally from the first side edge of the sheet of mesh to the second side edge of the sheet of mesh in which no vapor-retarding membrane is laminated to the mesh.

20 Claims, 11 Drawing Sheets

Related U.S. Application Data continuation of application No. 16/142,512, filed on Sep. 26, 2018, now Pat. No. 10,612,251.

(60) Provisional application No. 62/563,340, filed on Sep. 26, 2017.

(51) Int. Cl.
  E04B 1/62 (2006.01)
  E04B 1/76 (2006.01)

(56) References Cited

U.S. PATENT DOCUMENTS

| | | |
|---|---|---|
| 4,177,618 A | 12/1979 | Felter |
| 4,498,261 A | 2/1985 | Wilson |
| 4,712,347 A | 12/1987 | Sperber |
| 5,287,674 A | 2/1994 | Sperber |
| 5,365,716 A | 11/1994 | Munson |
| 5,697,198 A | 12/1997 | Ponder et al. |
| 5,819,496 A | 10/1998 | Sperber |
| 6,584,749 B2 | 7/2003 | Sperber |
| 6,808,772 B2 | 10/2004 | Kunzel |
| 7,040,345 B2 | 5/2006 | Koeger |
| 8,215,339 B2 | 7/2012 | O'Leary |
| 9,005,334 B2 | 4/2015 | Furuyama et al. |
| 9,481,995 B2 | 11/2016 | Bemis |
| 10,006,198 B2 | 6/2018 | Parsons et al. |
| 10,480,181 B1 | 11/2019 | Norris |
| 10,612,251 B2 | 4/2020 | Hartzell |
| 11,274,455 B2 | 3/2022 | Hartzell |
| 2002/0112442 A1 | 8/2002 | Sperber |
| 2005/0260904 A1 | 11/2005 | Shepherd |
| 2006/0059852 A1 | 3/2006 | Toas |
| 2007/0214739 A1 | 9/2007 | Shermer |
| 2007/0283652 A1 | 12/2007 | Chen |
| 2008/0145681 A1 | 6/2008 | Toas |
| 2008/0196826 A1 | 8/2008 | Polegato |
| 2010/0319275 A1 | 12/2010 | O'Leary |
| 2016/0326740 A1 | 11/2016 | Parsons et al. |
| 2017/0051502 A1 | 2/2017 | Wolf |
| 2017/0350116 A1 | 12/2017 | Brisley |
| 2019/0093357 A1 | 3/2019 | Hartzell et al. |
| 2020/0232232 A1 | 7/2020 | Hartzell |

FOREIGN PATENT DOCUMENTS

| | | |
|---|---|---|
| JP | 2005-016028 A | 1/2005 |
| JP | 2001-003469 A | 4/2008 |
| JP | 2011-256649 A | 12/2011 |

INSULATION-RETAINING SHEET HAVING INTEGRAL VAPOR-RETARDING MEMBRANE

This application is a continuation of U.S. patent application Ser. No. 16/841,305, filed Apr. 6, 2020, now U.S. patent Ser. No. 11/274,455, which is continuation of U.S. patent application Ser. No. 16/142,512, filed Sep. 25, 2018, now U.S. Pat. No. 10,612,251, which claims the benefit of priority of U.S. Provisional Patent Application No. 62/563,340, filed Sep. 26, 2017, each of which is hereby incorporated herein by reference in its entirety.

BACKGROUND OF THE DISCLOSURE

1. Field of the Disclosure

The present disclosure relates generally to building products. The present disclosure relates more particularly to an insulation-retaining sheet, e.g., for blown-in insulation, that includes an integral vapor-retarding membrane.

2. Technical Background

Conventional insulation for walls and ceilings of buildings is provided in the form of thick batts of fiberglass-based insulation material. These batts of insulation are typically installed between the framing members of the wall or ceiling, with a vapor-retarding membrane being installed to cover them in a separate operation. A wallboard encloses the insulation and the vapor-retarding membrane in the interior of the wall or ceiling.

However, in recent years, blow-in insulation has found increasing use in the insulation of such cavities. Blown-in insulation is provided as a loose fluff of material, with air pressure being used to convey it into a cavity that is to be insulated. The framing members of a building are typically themselves unable to form a cavity in which insulation can be blown; at the stage of insulation, while the outer sheeting and framing members can close off five of six faces of a rectangular cavity, the face of the cavity oriented toward the building interior remains open. To form an insulation cavity, a sheet of mesh is installed across the open face of the cavity, with an opening left for a tube to convey the insulation. As air pressure is used to blow the insulation into the cavity, the material of the mesh typically has to be open enough to allow air to escape the cavity. If the material enclosing the cavity does not allow air to escape the cavity at a sufficiently high rate, the resulting backpressure can cause that material to burst. In a typical installation, after the cavity is filled with insulation, a vapor-retarding membrane is installed over the mesh to provide the wall with a desired performance with respect to water vapor.

These conventional methods for insulating these walls can be difficult and time consuming. There remains a need for improved methods and materials for use with blown-in insulation materials.

SUMMARY OF THE DISCLOSURE

In one aspect, the present disclosure provides an insulation-retaining sheet having a top edge and an opposed bottom edge, and a first side edge and an opposed second side edge, the insulation-retaining sheet including:
  a sheet of mesh having an air permeability of at least 200 cfm per square foot, a top edge and an opposed bottom edge, and a first side edge and an opposed second side edge; and
  one or more strips of vapor-retarding membrane, each of the one or more strips of vapor retarding membrane each having a top edge and an opposed bottom edge, and a first side edge and an opposed second side edge, the one or more strips of vapor-retarding membrane being laminated to the sheet of mesh, the first side edge each of the strips of vapor-retarding membrane extending to the first side edge of the sheet of mesh, the second side edge each of the strips of vapor-retarding membrane extending to the second side edge of the sheet of mesh,
  wherein the insulation-retaining sheet has a plurality of open zones extending laterally from the first side edge of the sheet of mesh to the second side edge of the sheet of mesh in which no vapor-retarding membrane is laminated to the mesh.

In another aspect, the present disclosure provides a method of insulating one or more building cavities, the method including:
  providing one or more insulation cavities, each having an open face defined at least in part by a plurality of building members;
  substantially enclosing the one or more insulation cavities with an insulation-retaining sheet as described herein by affixing the insulation-retaining sheet to the plurality of building members; and
  blowing insulation into the one or more cavities.
Such a method can further include, after blowing the insulation into the one or more cavities, covering one or more of (e.g., each of) the open zones.

In another aspect, the present disclosure provides an insulated building cavity, the insulated building cavity including
  a cavity closed off on one face by an insulation-retaining sheet as described herein; and loose-fill insulation disposed in the cavity.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
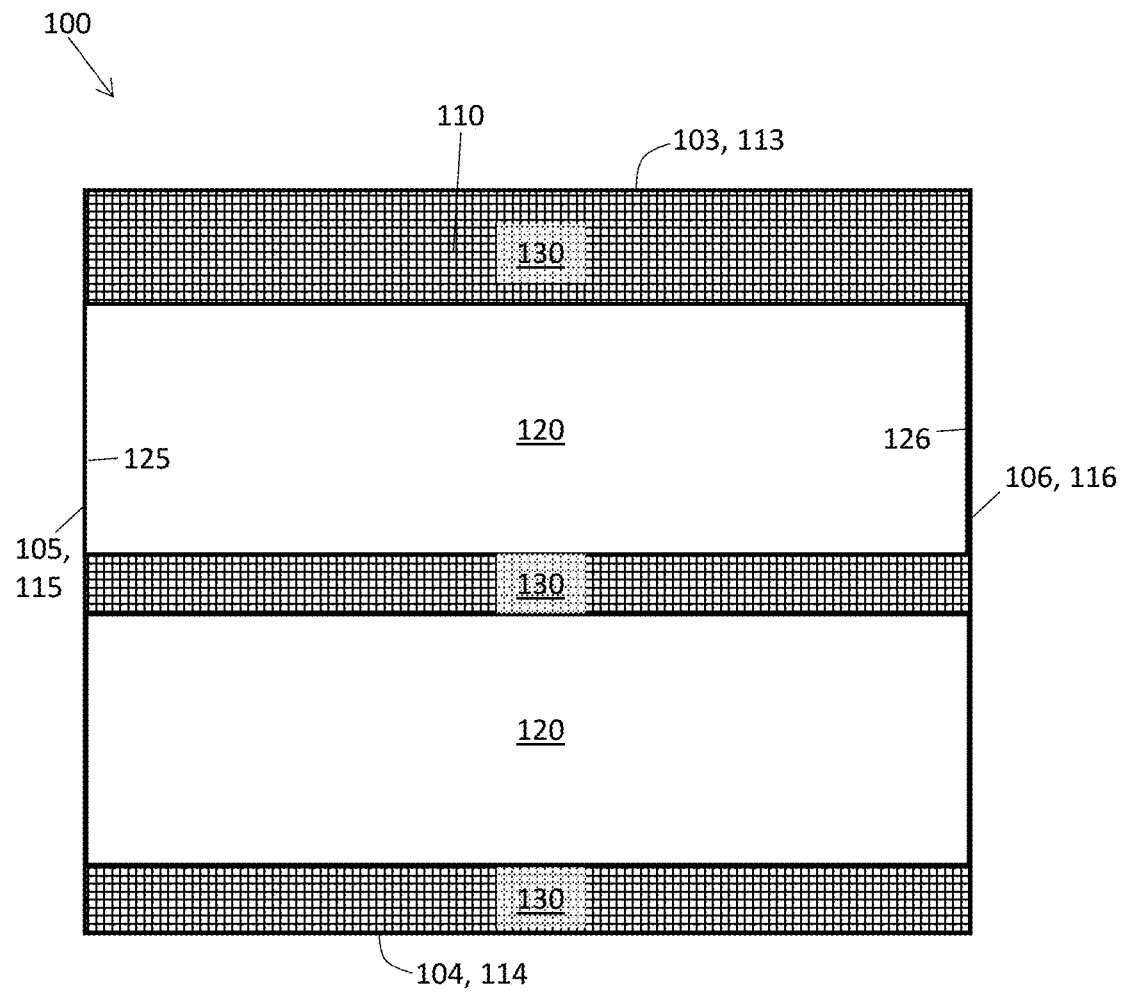
FIG. 1 is a schematic plan view of an insulation-retaining sheet according to one embodiment of the disclosure.

The present inventors have determined that an insulation-retaining sheet that includes an integral vapor-retarding membrane, when configured as described herein, can allow for blown-in insulation to be installed in a wall cavity without the formation of an undesirably high backpressure, yet remove the need for the installation of a separate vapor-retaining membrane. Accordingly, the methods and materials described herein can substantially simplify the insulation and vapor protection of building walls and ceilings, by requiring one less sheet installation operation. This is especially significant in that installation of sheet materials along a large wall or ceiling surface can be an unwieldy process due to the size of the surface and the flexibility of the materials. The insulation-retaining sheets described herein allow one less such operation, which represents a significant savings in time and manpower.

One aspect of the disclosure is an insulation-retaining sheet. One embodiment of such an insulation-retaining sheet is shown in schematic plan view in FIG. 1, and in schematic cross-sectional view in FIG. 2. Insulation-retaining sheet 100 has a top edge 103 and an opposed bottom edge 104, and a first side edge 105 and an opposed second side edge 106. The insulation-retaining sheet 100 includes a sheet of mesh 110 having an air permeability of at least 200 cfm (cubic feet per minute) per square foot (e.g., at least 300 cfm per square foot) as measured by ASTM D737-961 (i.e., without being laminated to vapor-retarding membrane). The sheet of mesh 110 has a top edge 113 and an opposed bottom edge 114, and a first side edge 115 and an opposed second side edge 116. Insulation-retaining sheet 100 also includes one or more (here, two) strips of vapor-retarding membrane 120 laminated to the sheet of mesh 110. The first side edge 125 of each of the strips of vapor retarding membrane extends to the first side edge 115 of the sheet of mesh, and the second side edge 126 of each of the strips of vapor retarding membrane extends to the first side edge 116 of the sheet of mesh.

Notably, the insulation-retaining sheet has a plurality of open zones 130 extending laterally from the first side edge 115 of the mesh to the second side edge of the mesh 116. In these open zones, no vapor-retarding membrane is laminated to the mesh. These open zones are configured such that air can readily escape through the mesh, so that when the insulation-retaining sheet installed to enclose a wall or ceiling, the open zones can prevent pressure buildup in the cavity from air used to blow insulation into the cavity.

In certain desirable embodiments, and as shown in FIG. 1, the first side edge of the mesh extends to the first side edge of the insulation-retaining sheet, and the second side edge of the mesh extends to the second side edge of the insulation-retaining sheet. In certain such desirable embodiments, the first side edge of each of the strips of vapor retarding membrane extends to the first side edge of the insulation-retaining sheet, and the second side edge of each of the strips of vapor retarding membrane extends to the second side edge of the insulation-retaining sheet. Such embodiments can be especially desirable, in that they can enable the person of ordinary skill in the art to use roll-to-roll processes to manufacture them, and in that they can result in long lengths of insulation-retaining sheet that can be arbitrarily cut to desired lengths by a user for installation in a building. In cases where the sheet of mesh does not extend to both side edges of the insulation-retaining sheet, it desirably extends at least 90%, or at least 95% of the distance between the side edges of the insulation-retaining sheet.

Similarly, in certain desirable embodiments, and as shown in FIG. 1, the top edge of the mesh extends to the top edge of the insulation-retaining sheet, and the bottom edge of the mesh extends to the bottom edge of the insulation-retaining sheet. In cases where the sheet of mesh does not extend to both top and bottom edges of the insulation-retaining sheet, it desirably extends at least 90%, or at least 95% of the distance between the side edges of the insulation-retaining sheet.

As the person of ordinary skill in the art will appreciate, the material of the sheet of mesh allows significant amounts of air to flow through it. As described above, the sheet of mesh has an air permeability of at least 200 cfm per square foot. In certain embodiments as otherwise described herein, the sheet of mesh has an air permeability of at least 250 cfm per square foot or at least 300 cfm per square foot, for example, at least 400 cfm per square foot, or even at least 450 cfm per square foot. Air permeabilities of the sheet of mesh as described herein are measured according to ASTM D737-961, on the mesh material itself (i.e., not as configured in the insulation-retaining sheet). Use of a sheet of mesh with a high enough airflow can allow the open zones of the insulation-retaining sheet to pass enough air such that there is not an undesirably high degree of pressure buildup during blow-in of insulation, even though much of the area of the sheet of mesh is covered by the laminated vapor-retarding membrane.

As the person of ordinary skill in the art will appreciate from the present disclosure, the sheet of mesh can be formed from many materials. For example, in certain embodiments as otherwise described herein, the mesh is a fabric mesh, such as a woven fabric mesh or a non-woven fabric mesh. The mesh can be formed from, for example, a polymer such as polyethylene or polypropylene. In other embodiments, the mesh is formed from glass, textile, cotton, hemp, nylon, or similar materials (e.g., in fiber form, woven or non-woven). The mesh desirably has a pore size that is small enough such that significant amounts of blown-in insulation do not escape through the fabric. For example, in certain embodiments, the mesh has an average pore size no greater than 1 mm, e.g., no greater than 500 microns. The person of ordinary skill in the art will appreciate that many conventional fabrics used conventionally in blown-in insulation systems can be used as the sheet of mesh in the construction of the insulation-retaining sheets as described herein. One suitable material for use as a fabric mesh is OPTIMA® Fabric, available from CertainTeed Corporation. Others are available under a variety of tradenames from a variety of suppliers, such as INSULWEB, manufactured by Hanes Engineered Materials.

Similarly, the person of ordinary skill in the art will appreciate from the present disclosure that the vapor-retarding membrane can take a wide variety of forms. A wide variety of vapor-retarding membranes are available to the person of ordinary skill in the art. For example, in certain embodiments as otherwise described herein, the vapor-retarding membrane has a water vapor permeance of no more than about 1 Perm at 25% relative humidity, as tested by ASTM E96 at 23° C. In certain embodiments as otherwise described herein, the vapor-retarding membrane has a water vapor permeance of at least 2 perms, e.g., in the range of 4-15 perms, or in the range of 6-12 perms at 75% relative humidity as tested by ASTM E96 at 23° C. In certain such embodiments, the vapor retarding membrane has not only a water vapor permeance of no more than about 1 Perm at 25% relative humidity, but also a water vapor permeance of at least 2 perms, e.g., in the range of 4-15 perms, e.g., in the range of 6-12 perms at 75% relative humidity, all as tested by ASTM E96 at 23° C. Thus, the vapor retarding membrane can be a so-called "smart vapor retarder," i.e., being configured to retard diffusion of water vapor under dry conditions but allow diffusion of water vapor under especially humid conditions. In certain such embodiments, the vapor retarding membrane also has one or more of a) a water vapor permeance of no more than 5 perms, e.g., no more than 2.5 perms or less at 45% relative humidity, and b) a water vapor permeance of at least about 5 Perms (e.g., at least about 8 Perms, or at least about 12 Perms, or at least about 15 Perms, or at least about 20 Perms) at 95% relative humidity, both as tested by ASTM E96 at 23° C. For example, in certain embodiments as otherwise described herein, the membrane has a water vapor permeance no more than 1 perm at 25% relative humidity; a water vapor permeance of no more than 5 perms, or even 2.5 perms or less at 45% relative humidity; and a water vapor permeance in a range of from 6 perms to 12 perms at 75% relative humidity; and a water vapor permeance of at least 20 perms at 95% relative humidity, all as tested by ASTM E96 at 23° C.

Water vapor permeance values as described herein are measured using the ASTM E96 "desiccant method" (i.e., dry cup) or the ASTM E96 "water vapor method" (i.e., wet cup), as noted below. Specifically, samples were sealed over either dry cups filled with desiccant to achieve the 25% and 45% average relative humidity conditions or sealed over wet cups filled with deionized water to achieve the 75% and 95% RH conditions. The cups were placed in a humidity chamber at either 50% relative humidity (for 25% or 75% average relative humidity conditions) or 90% relative humidity (for the 45% or 95% average relative humidity conditions). The "relative humidity" of a given test is taken as the average of the environment in the cup (i.e., 0% or 100%) and the environment in the chamber (i.e., 50% or 90%), based on the assumption that the sample itself will be at a humidity in between the two values. So a dry cup test performed in a 90% relative humidity chamber will be at a nominal relative humidity value of 45%. Similarly, 25% relative humidity values are determined in a dry cup measurement at a chamber humidity of 50%; 75% relative humidity values are determined in a wet cup measurement at a chamber humidity of 50%; and 95% relative humidity values are determined in a wet cup measurement at a chamber humidity of 90%. Experiments are otherwise performed as described in ASTM E96, which is hereby incorporated herein by reference in its entirety.

One suitable such membrane is the MemBrain™ Continuous Air Barrier & Smart Vapor Retarder membrane available from CertainTeed Corporation. Others include, for example, products available from ISOVER under the tradename Vario, such as Vario Duplex, Vario Triplex, Vario Xtra and Vario XtraSafe. Other suitable membranes are disclosed in U.S. Patent Application Publication no. 2016/0185994, U.S. Patent Application Publication no. 2015/0090126, U.S. Pat. No. 6,808,772, and U.S. Provisional Patent Applications Nos. 62/527,596 and 62/527,609, each of which is hereby incorporated by reference in its entirety for all purposes, and especially for their description of suitable membranes.

The vapor-retarding membrane can be formed from a variety of materials. For example, in certain embodiments as otherwise described herein, the vapor-retarding membrane is a polymer sheet, such as a polymer laminate. Suitable polymers include, for example, polyethylene, polypropylene, nylon (e.g., nylon-6) and poly(vinyl chloride). In other embodiments as otherwise described herein, the vapor-retarding membrane is a sheet, such as a non-woven fabric or kraft paper, having a vapor-retarding coating or laminate formed thereon. The person of ordinary skill in the art will appreciate that many conventional vapor retarding membranes used conventionally in building systems can be used as the vapor-retarding membrane in the construction of the insulation-retaining sheets as described herein.

The vapor-retarding membrane can also be provided as a cured coating layer that is applied directly to the sheet of mesh in one or more strips. Such a cured coating can completely fill the void spaces of the mesh in the areas where it is applied, and thereby provide an effective coating for retarding water vapor. In certain embodiments as otherwise described herein, the coating can penetrate into the substrate by at least about 1%, at least about 5%, or even at least about 10% of the thickness of the mesh. In certain embodiments as otherwise described herein, the barrier layer can penetrate into the mesh by no more than 95%, no more than 90%, or even no more than 85% of the thickness of the mesh. In other embodiments, the mesh can be completely saturated such that a continuous layer of the coating is disposed on both major surfaces of the mesh. The person of ordinary skill in the art can provide coated sheets of mesh based on the disclosure herein, especially in conjunction with the description provided in U.S. Patent Application Publication no. 2016/0185994, and U.S. Provisional Patent Applications Nos. 62/527,596 and 62/527,609.

The person of ordinary skill in the art will appreciate that the one or more strips of vapor-retarding membrane can be provided on the sheet of mesh in a variety of manners. For example, in some embodiments, a layer of adhesive affixes the strip(s) of vapor-retarding membrane to the sheet of mesh. The person of ordinary skill in the art will select an adhesive that is compatible with the materials of the mesh and of the membrane, and will take into account the vapor-retarding properties of the adhesive itself. The person of ordinary skill in the art can select an amount and type of adhesive that provides the overall laminate (i.e., the vapor retarding membrane laminated to the sheet of mesh and any intervening adhesive) with desirable vapor permeance behavior in conjunction with acceptable adhesion. In other embodiments, the materials are such that they can make a tenacious bond through heat-pressing; in such cases, there may be an intimate bond between the materials of the mesh and of the membrane. The vapor-retarding membrane can in some embodiments be provided as a cured coating; in such cases, the strip(s) of vapor-retarding membrane can be applied to the sheet of mesh by providing a suitable coating composition on the sheet of mesh, and allowing the coating composition to cure to provide the coating. Coating compositions are described, for example, in U.S. Patent Application Publication no. 2016/0185994, and U.S. Provisional Patent Application No. 62/527,596, each of which is hereby incorporated herein by reference in its entirety.

The presence of the sheet of mesh and any adhesive may change the vapor permeance behavior of the laminate from that of the vapor-retarding membrane below. However, the person of ordinary skill in the art will be able to account for this in selection of materials. In certain desirable embodiments as otherwise described herein, the insulation-retaining sheet has, in the laminated zones thereof, a water vapor permeance of no more than about 1 Perm at 25% relative humidity, as tested by ASTM E96 at 23° C. In certain embodiments as otherwise described herein, the insulation-retaining sheet has, in the laminated zones thereof, a water vapor permeance of no more than 5 perms, e.g., no more than 2.5 perms or less at 45% relative humidity, and b) a water vapor perm rating of at least 2 perms, e.g., in the range of 4-15 perms, or in the range of 6-12 perms at 75% relative humidity as tested by ASTM E96 at 23° C. In certain such embodiments, the insulation-retaining sheet has, in the laminated zones thereof, not only a water vapor permeance of no more than about 1 Perm at 25% relative humidity, but also a water vapor permeance of no more than 5 perms, e.g., no more than 2.5 perms or less at 45% relative humidity, and b) a water vapor perm rating of at least 2 perms, e.g., in the range of 4-15 perms, or in the range of 6-12 perms at 75% relative humidity as tested by ASTM E96 at 23° C. Thus, the insulation retaining sheet can function as a so-called "smart vapor retarder," i.e., being configured to retard diffusion of water vapor under dry conditions but allow diffusion of water vapor under especially humid conditions. In certain such embodiments, the insulation-retaining sheet also has, in the laminated zones thereof, has one or more of a) a water vapor permeance of no more than 5 perms, e.g., no more than 2.5 perms or less at 45% relative humidity, and b) a water vapor perm rating of in the range of at least about 5 Perms (e.g., at least about 8 Perms, or at least about 12 Perms, or at least about 15 Perms, or at least about 20 Perms) at 95% relative humidity as tested by ASTM E96 at 23° C. For example, in certain embodiments as otherwise described herein, the membrane has a water vapor permeance no more than 1 perm at 25% relative humidity; a water vapor permeance of no more than 5 perms, or even 2.5 perms or less at 45% relative humidity; a water vapor permeance in a range of from 6 perms to 12 perms at 75% relative humidity; and a water vapor permeance of at least 20 perms at 95% relative humidity, all as tested by ASTM E96 at 23° C.

And, in certain desirable embodiments as otherwise described herein, the insulation-retaining sheet has, in the laminated zones thereof, any water vapor permeance value as described above with respect to the vapor-retarding membrane.

As the person of ordinary skill in the art will appreciate from the present disclosure, the insulation-retaining sheet can be configured in a variety of ways to provide open zones as described herein. For example, in certain embodiments of the insulation-retaining sheets as otherwise described herein, there are a plurality of the strips of vapor-retarding membrane. For example, in the embodiment of FIGS. 1 and 2, there are two strips of vapor-retarding membrane. But in other embodiments, a different number of strips of vapor-retarding membrane can be used. Use of more strips of vapor-retarding membrane can be advantageous in some situations to allow for more open zones to be formed on the insulation-retaining sheet, and thus allow for pressure to escape a cavity to be insulated at more points along its height. For example, the embodiment of the insulation-retaining sheet 300 shown in schematic plan view in FIG. 3, there are four strips of vapor retarding membrane 320, forming five open zones 330. But provision of more open zones can also, in some embodiments, require more open zones to be covered after the blowing in of insulation, as described in more detail below. In certain embodiments, the number of strips of vapor-retarding membrane is in the range of 2-10, for example, in the range of 2-8, or 2-6, or 2-4, or 3-10, or 3-8, or 3-6, or 5-10, or 5-8.

And in other embodiments of the insulation-retaining sheets as otherwise described herein, there is only a single strip of vapor-retarding membrane. For example, the embodiment of the insulation-retaining sheet 400 shown in schematic plan view in FIG. 4, there is a lone strip of vapor retarding membrane 420, forming two open zones, one along the top edge of the insulation-retaining sheet and the other along the bottom edge of the insulation-retaining sheet.

As the person of ordinary skill in the art will appreciate, the one or more open zones can be configured in a variety of ways. For example, in certain embodiments of the insulation-retaining sheets as otherwise described herein, the one or more open zones include a top open zone extending along the top edge of the insulation-retaining membrane and a bottom open zone extending along the bottom edge of the insulation-retaining membrane, for example, as shown in the embodiments of FIGS. 1-4. In certain such embodiments, these are the only open zones of the insulation-retaining membrane, for example, as shown in FIG. 4. Of course, in other embodiments, there is an open zone along the top edge of the insulation-retaining sheet but not along its bottom edge, or along the bottom edge of the insulation-retaining sheet but not along its top edge. Use of open zones at the top edge and/or the bottom edge of the insulation-retaining membrane can be advantageous, in that it can help to ensure that the corners of the cavity are filled by blown-in insulation.

Figure 2:
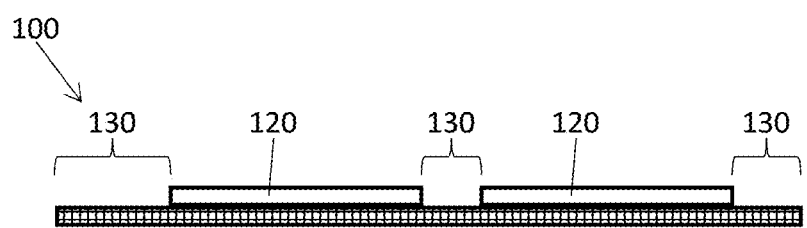
FIG. 2 is a schematic cross-sectional view of the insulation-retaining sheet of FIG.
Figure 3:
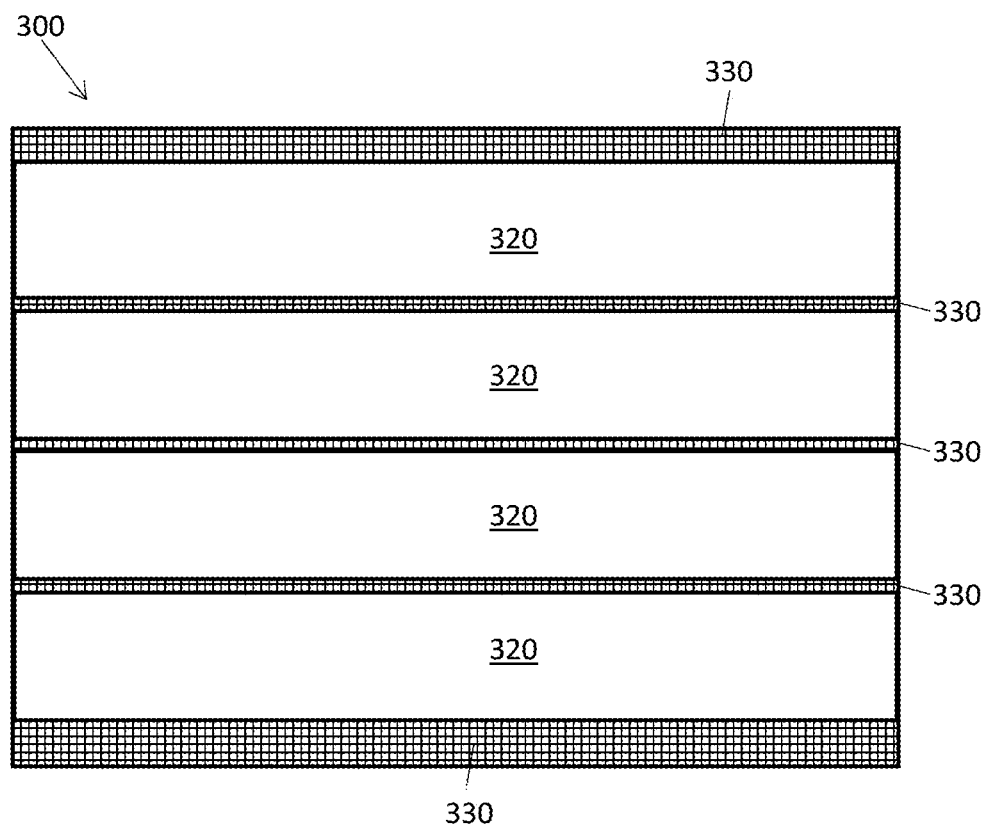
FIG. 3 is a schematic plan view of an insulation-retaining sheet according to another embodiment of the disclosure.
Figure 4:
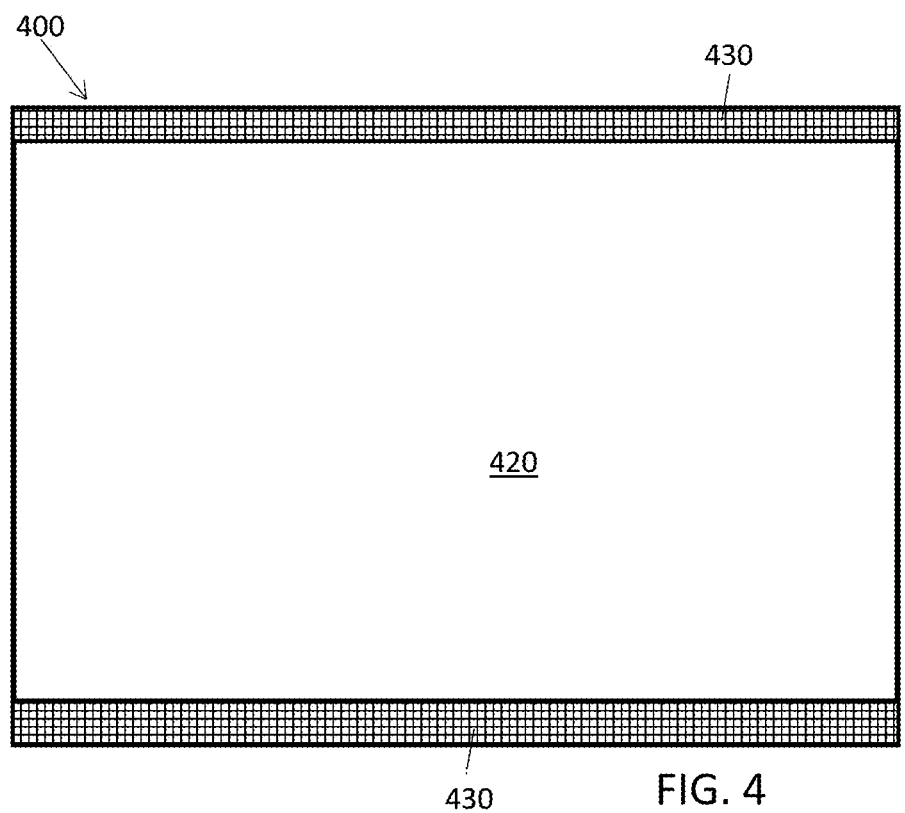
FIG. 4 is a schematic plan view of an insulation-retaining sheet according to another embodiment of the disclosure.

In certain embodiments of the insulation-retaining sheets as otherwise described herein, the one or more open zones include one or more interior open zones extending across the sheet of mesh between its top edge and its bottom edge, for example, as shown in the embodiments of FIGS. 1-3. Use of open zones in an interior section of the insulation-retaining membrane can be advantageous, in that it can help to ensure that pressure is relieved throughout the volume of the cavity are during the blowing in of insulation. One or more interior open zones can be used in combination with, or instead of open zone(s) along the top edge and/or the bottom edge of the insulation-retaining sheet.

As the person of ordinary skill in the art will appreciate from the present disclosure, the insulation-retaining sheet can be configured with any number of open zones as described herein. For example, in certain embodiments, the number of open zones is in the range of 2-10. For example, in the embodiment of FIGS. 1 and 2, there are three open zones. In the embodiment of FIG. 4, there are six open zones. And in the embodiment of FIG. 3, there are two open zones. As noted above, the use of more open zones can allow for pressure to escape a cavity to be insulated at more points along its height. But provision of more open zones can also, in some embodiments, require more open zones to be covered after the blowing in of insulation, as described in more detail below. In certain embodiments as otherwise described herein, the number of open zones of the vapor-retarding membrane is in the range of 2-11, for example, in the range of 2-9, or 2-7, or 2-5, or 3-11, or 3-9, or 3-7, or 5-11, or 5-9. For example, in certain embodiments as otherwise described herein, the insulation-retaining sheet has two open zones, or three open zones, or four open zones.

In certain embodiments, each of the strips of vapor-retarding membrane is laminated to the sheet of mesh substantially throughout its height. This configuration is shown in the schematic cross-sectional view of FIG. 2. Here, the one or more open zones are not covered by any loose material. In certain such embodiments, the open zones can be covered by strips of material, such as tape or strips of vapor-retarding membrane, after insulation is blown into a cavity, as described in more detail below.

In other embodiments, at least some of the strips of vapor retarding membrane are configured to form flaps over the one or more open zones. Such flaps will not interfere substantially with air escaping through the mesh in the one or more open zones. After insulation is blown into a cavity, as described in more detail below, each flap can be affixed to the mesh or to another strip of vapor retarding membrane to cover the open zones.

Figure 5:
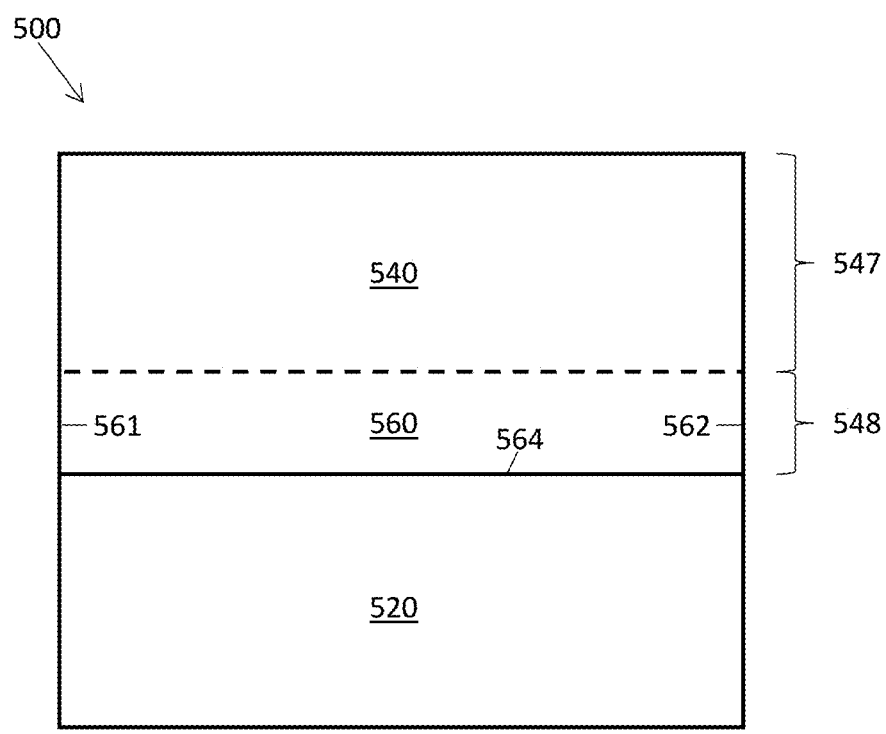
FIG. 5 is a schematic plan view of an insulation-retaining sheet according to another embodiment of the disclosure.
Figures 6, 7:
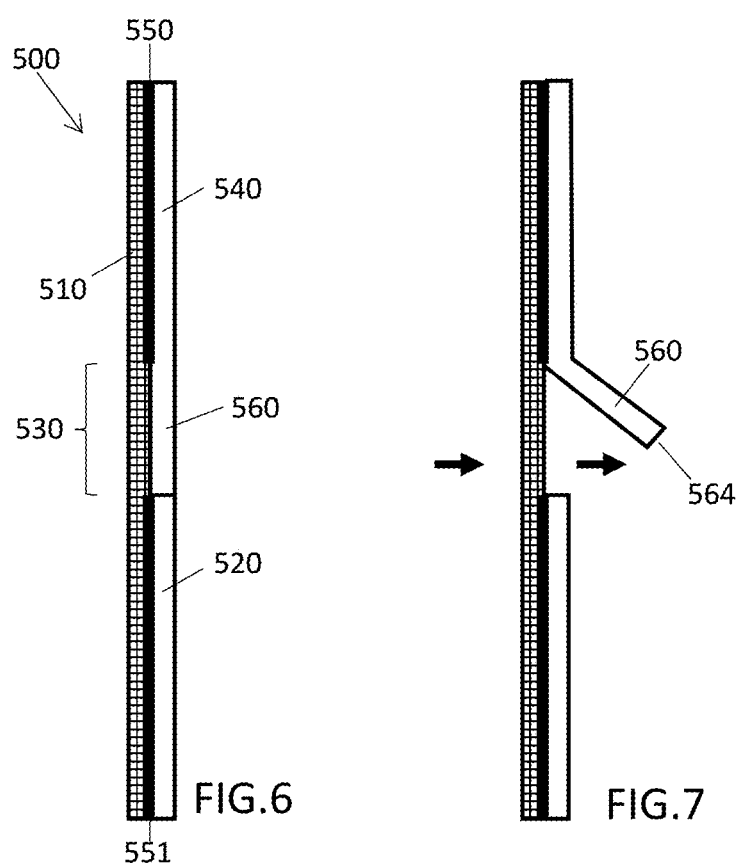
FIGS. 6 and 7 are schematic cross-sectional views of the insulation-retaining sheet of FIG. 5.

Accordingly, in certain embodiments of the insulation-retaining sheets as otherwise described herein, the one or more strips of vapor retarding membrane comprise one or more first strips of vapor retarding membrane, each having a top zone in a top-most portion of the first strip, the top zone extending from the first side edge to the second side edge of the first strip, the top zone being laminated to the sheet of mesh, and a bottom zone in a bottom-most portion of the first strip adjacent the top portion of the first strip, the bottom zone extending from the first side edge to the second side edge of the first strip, the bottom zone not being affixed to the sheet of mesh, the bottom zone forming a flap having a bottom edge, a first side edge and an opposed second side edge. Such an embodiment is shown in schematic plan view in FIG. 5, and schematic cross-sectional views in FIGS. 6 and 7. Here, insulation-retaining sheet 500 has a first strip of vapor retarding membrane 540, which has a top zone 547 and a bottom zone 548. The dark line 550 indicates an adhesive bonding the top zone 547 of the first strip 540 to the sheet of mesh 510. The bottom zone 548 of the first strip 540 is not affixed to the mesh; an open zone 530 is formed by the area of mesh to which the first strip is not affixed. Accordingly, it forms a flap 560 having a bottom edge 564, a first side edge 561 and an opposed second side edge 562. The flap 560 is free to lift away from the mesh when air blows through the membrane (as shown by the arrows in FIG. 7), thereby not significantly affecting the flow of air through the open zone 530.

Of course, the person of ordinary skill in the art will appreciate that multiple first strips may be used in the insulation-retaining sheets as described herein. While the embodiment shown in FIGS. 5-7 has only a single first strip, in other embodiments an insulation-retaining sheet as otherwise described herein can have two first strips, three first strips, or four first strips. In still other embodiments, an insulation-retaining sheet as otherwise described herein can have in the range of 2-10 first strips, e.g., in the range of 2-9, or 2-7, or 2-5, or 3-11, or 3-9, or 3-7, or 5-11, or 5-9.

In certain embodiments of the insulation-retaining sheets as otherwise described herein, the one or more strips of vapor retarding membrane include not only one or more first strips as described above, but also one or more second strips of vapor-retarding membrane, each of the one or more second strips of vapor retarding membrane being laminated to the sheet of mesh substantially throughout its height. For example, the insulation-retaining sheet 500 of FIGS. 5-7 includes a second strip 528 of vapor retarding membrane, laminated to the sheet of mesh substantially throughout its height, as indicated by shown by the dark line 551 indicating an adhesive bonding the second strip 520 to the sheet of mesh 510.

In certain embodiments of the insulation-retaining sheets as otherwise described herein, one or more of the flaps (e.g., each of the one or more flaps) substantially covers the open zone defined thereby. For example, in the embodiment of FIGS. 5-7, the flap substantially exactly covers the open zone. That is, in the embodiment of FIGS. 5-7, the flap does not substantially overlap another strip of vapor-retarding membrane.

Figure 8:
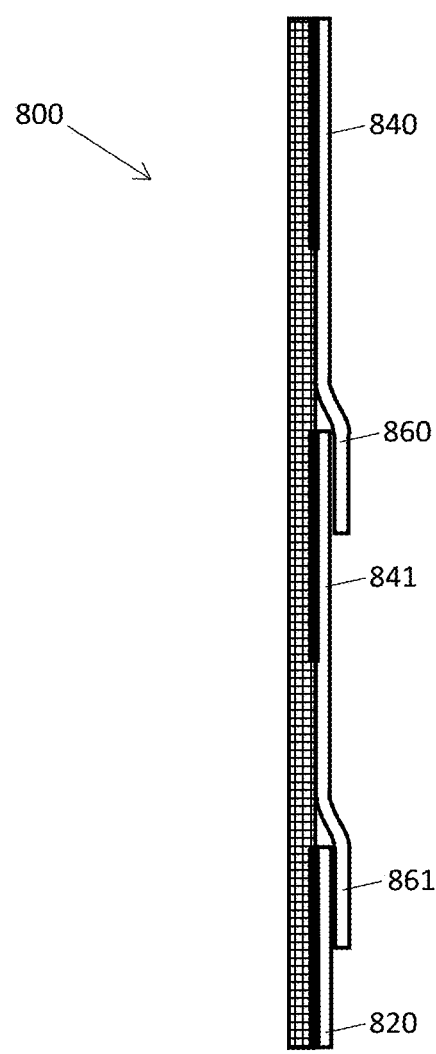
FIG. 8 is a schematic cross-sectional view of an insulation-retaining sheet according to another embodiment of the disclosure.

In certain embodiments of the insulation-retaining sheets as otherwise described herein, one or more of the flaps (e.g., each of the one or more flaps) substantially overlaps a neighboring strip of vapor-retarding membrane. One such embodiment is shown in schematic cross-sectional view in FIG. 8. In insulation-retaining sheet 800, there are two first strips 840 and 841 of vapor-retarding membrane, with their top zones laminated to the sheet of mesh and their bottom zones unaffixed to the sheet of mesh 810. There is also a second strip 820 of vapor-retarding membrane laminated to the sheet of mesh. Notably, the flap 860 formed by first strip 840, substantially overlaps its downward neighboring strip of vapor-retarding membrane, first strip 841. And the flap 861 formed by first strip 841 substantially overlaps its downward neighboring strip of vapor-retarding membrane, second strip 820. In such embodiments, after insulation is blown in, the flap can be affixed with tape or an adhesive to its neighboring strip of vapor-retarding membrane.

Figure 9:
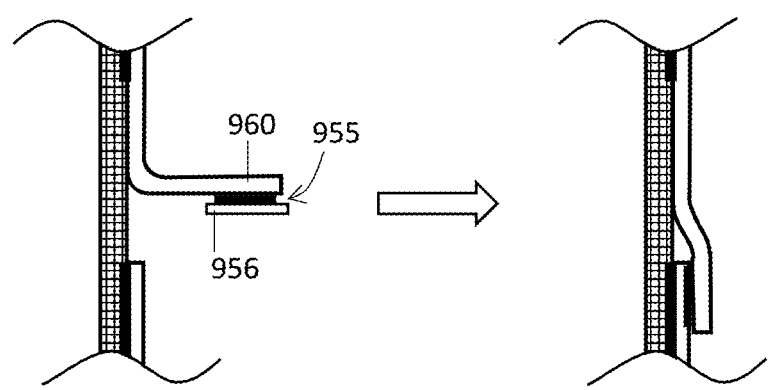
FIG. 9 is a partial schematic cross-sectional view of an insulation-retaining sheet according to another embodiment of the disclosure.

For example, in certain such embodiments, one or more of (e.g., each of) the overlapping flaps has a strip of adhesive, for example, with a removable liner, disposed along its bottom edge facing the sheet of mesh. In such embodiments, the flap can freely lift away from the mesh of the open zone during blowing in of insulation, then afterwards an installer can adhere the flap to a neighboring strip of vapor-retarding membrane, e.g., by peeling the liner away to expose the adhesive. Such an embodiment is shown in partial schematic cross-sectional view in FIG. 9. Here, in the left-hand image, flap 960 has a strip of adhesive 955 disposed along its bottom edge (shown folded up). A removable liner 956 covers the strip of adhesive. An installer can remove the removable liner and affix the flap to the neighboring strip of vapor-retarding membrane, as shown in the right-hand image.

While the flaps are shown as being configured to cover a downwardly-situated open zone in FIGS. 6-9, the person of ordinary skill in the art will appreciate that the insulation-retaining sheet can alternatively be configured so that they cover an upwardly-situated open zone. In such case, when installed, the flaps can fall away from the open zone entirely, but be affixed to cover the open zone after insulation is blown in.

The person of ordinary skill in the art will select the relative heights of the top (laminated) zone and the bottom (unaffixed) zone of each first strip, in conjunction with the heights of any second strips, to provide a desired area of open zone(s) to the insulation-retaining membrane. For example, in certain embodiments, in each first strip, the height of the top zone is at least the height of the bottom zone, e.g., at least 1.5 times, at least 2 times, or at least 3 times the height of the bottom zone. In certain embodiments, in each first strip, the height of the top zone is no more than 20 times the height of the bottom zone, e.g., no more than 15 times, or no more than 10 times the height of the bottom zone.

The height of the bottom zone of each first strip of vapor-retarding membrane can help to determine the height of the corresponding open zone of the insulation-retaining membrane. For example, in certain embodiments as otherwise described herein, in each first strip of material, the bottom zone is at least 2 inches in height. For example, in certain such embodiments, the bottom zone of each first strip of vapor retarding membrane is at least 4 inches, or even at least 8 inches in height. In certain such embodiments, the bottom zone of each first strip of vapor retarding membrane is in the range of 2-25 inches, or 2-16 inches, or 4-25 inches, or 4-16 inches, or 8-25 inches, or 8-16 inches in height.

Figure 17:
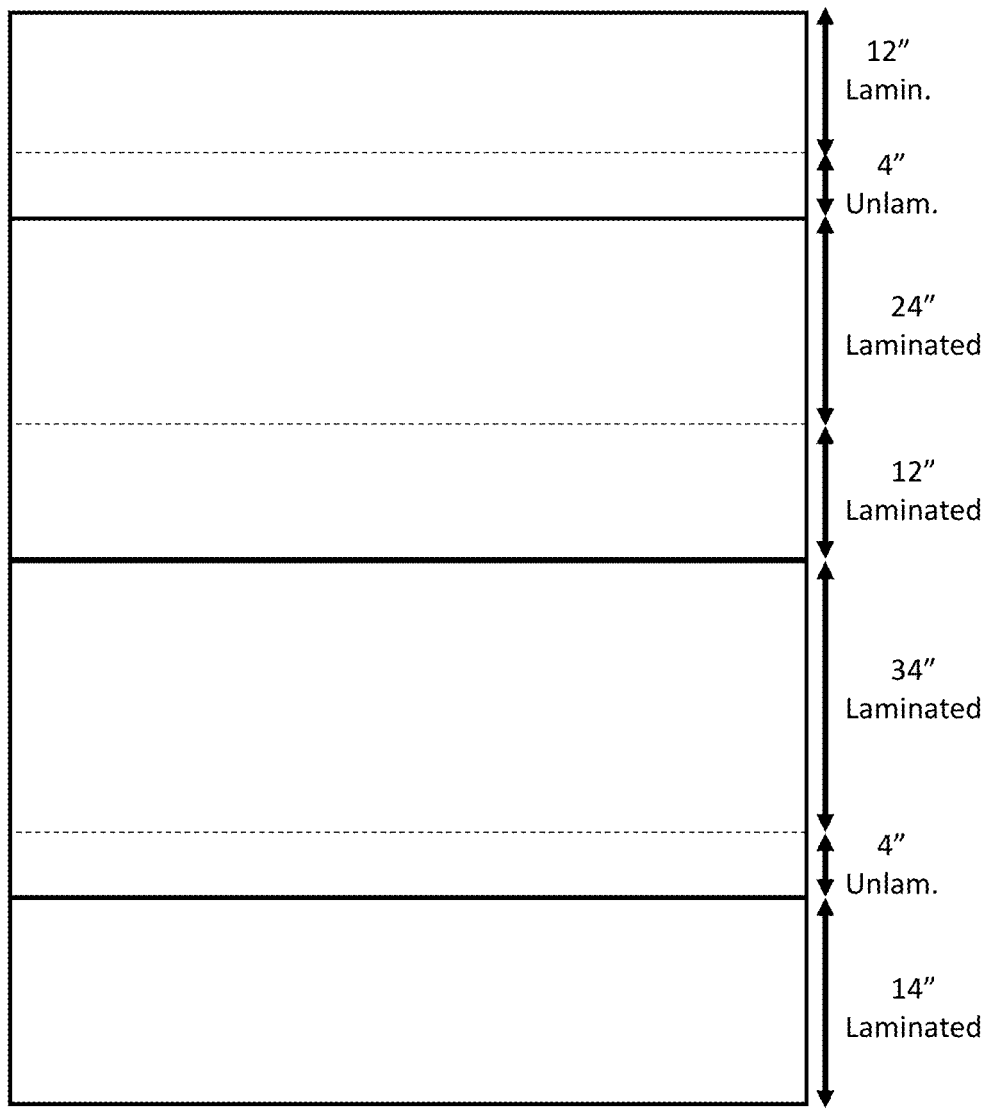
FIGS. 17-19 are schematic plan views of particular examples of the insulation-retaining sheets as described herein.
Figure 18:
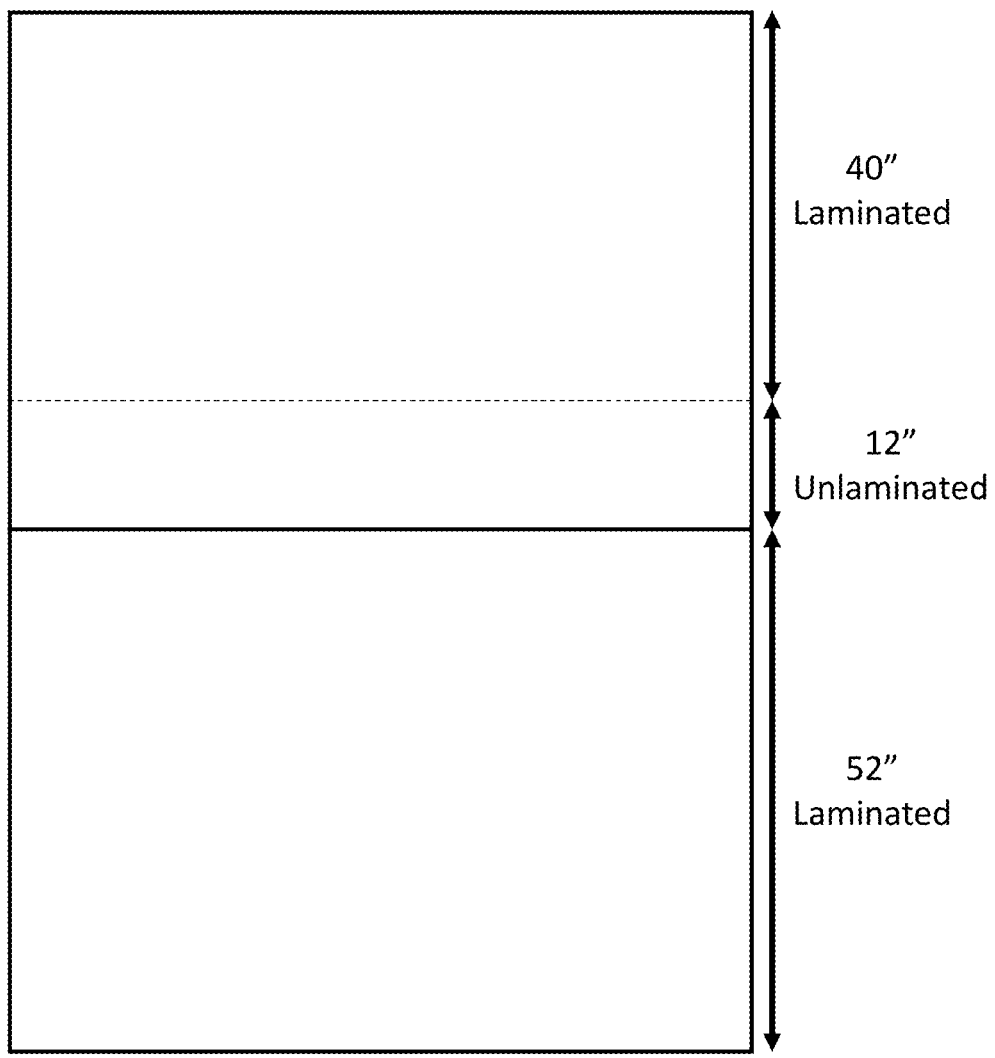
Figure 19:
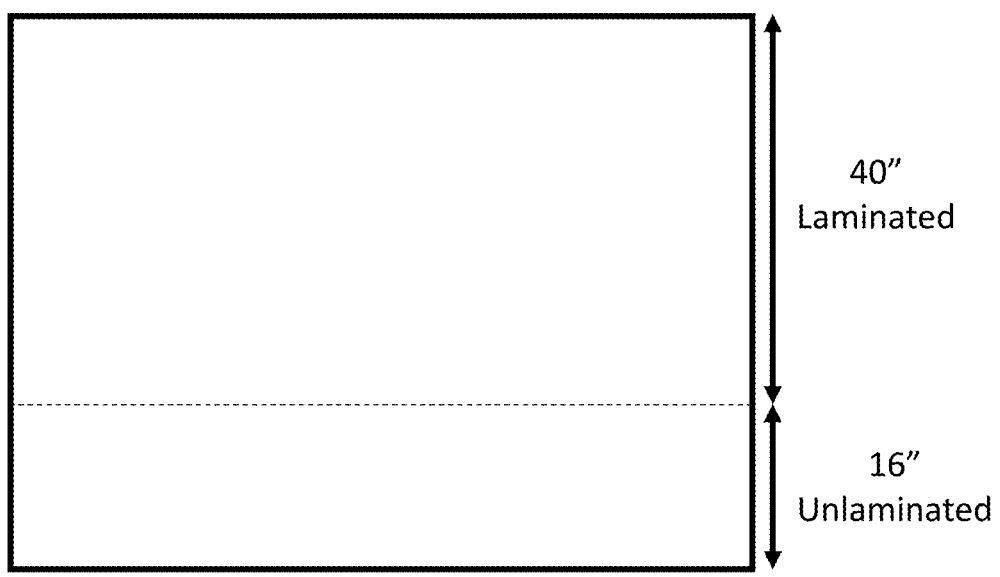

The strips of vapor-retarding membrane can have a variety of heights. In certain embodiments of the insulation-retaining sheets as otherwise described herein, each of the strips of vapor retarding membrane has a height of at least 4 inches, at least 8 inches, at least 15 inches, or even at least 25 inches. For example, in certain embodiments, each of the strips of vapor-retarding membrane has a height of in the range of 4 inches to 180 inches, e.g., in the range of 4-160 inches, or 4-128 inches, or 4-104 inches, or 4-76 inches, or 4-66 inches, or 4-54 inches, or 4-42 inches, or 4-30 inches, or 8-180 inches, or 8-160 inches, or 8-128 inches, or 8-104 inches, or 8-76 inches, or 8-66 inches, or 8-54 inches, or 8-42 inches, or 8-30 inches, or 18-180 inches, or 18-160 inches, or 18-128 inches, or 18-104 inches, or 18-76 inches, or 18-66 inches, or 18-54 inches, or 18-42 inches, or 30-180 inches, or 30-160 inches, or 30-128 inches, or 30-104 inches, or 30-76 inches, or 30-66 inches, or 30-54 inches, or 30-42 inches, or 42-180 inches, or 42-160 inches, or 42-128 inches, or 42-104 inches, or 42-76 inches, or 42-66 inches, or 42-54 inches, or 54-180 inches, or 54-160 inches, or 54-128 inches, or 54-104 inches, or 54-76 inches, or 54-66 inches, or 66-180 inches, or 66-160 inches, or 66-128 inches, or 66-104 inches, or 66-76 inches, or 76-180 inches, or 76-160 inches, or 76-128 inches, or 76-104 inches. In certain embodiments, each strip has a height selected from about 12", about 16", about 18", about 24", about 36", about 48", about 54", or about 72". The person of ordinary skill in the art will appreciate that the various strips of vapor-retarding membrane in a given insulation-retaining sheet of the disclosure can have different heights. The person of ordinary skill in the art can combine multiple strips of desired heights to provide an insulation-retaining sheet having an overall architecture and overall pattern of open zones. FIGS. 17-19 show a few different examples of configurations. In other examples, an insulation-retaining sheet seven feet in height having one or more "flaps" (as described with respect to FIGS. 5-7) can be made with a 48" strip and a 36" strip. Similarly, an insulation-retaining sheet eight feet in height having one or more flaps can be made with two 48" strips; an analogous nine foot high insulation-retaining sheet can be made with a 48" strip and a 60" strip or three 36" strips; an analogous ten foot high insulation-retaining sheet can be made with two 60" strips or a 72" strip and a 48" strip; an analogous eleven foot insulation-retaining sheet can be made with two 48" strips and a 36" strip; and an analogous twelve foot high insulation-retaining sheet can be made with three 48" strips or four 36" strips. Other combinations will be apparent to the person of ordinary skill in the art, and the person of ordinary skill in the art will take into account the presence of any open zone(s) not configured to be covered by flaps when calculating heights of strips to be used in designing a given insulation-retaining sheet.

The person of ordinary skill in the art, based on the disclosure herein, will select the heights of the one or more open zones, in conjunction with the number of open zones, to provide a desired balance of coverage by vapor-retarding membrane and airflow during blowing in of insulation. Moreover, it can be desirable to keep the height of each open zone relatively low, in order to simplify the operation of covering up the open zone(s) after blowing in of insulation. For example, in certain embodiments, each of the open zones has a height in the range of 1-24 inches. In certain such embodiments, each of the open zones has a height in the range of 1-16 inches, or 1-12 inches, or 1-8 inches, or 1-6 inches, or 1-4 inches, or 2-24 inches, or 2-16 inches, or 2-12 inches, or 2-8 inches, or 2-6 inches, or 2-4 inches, or 3-24 inches, or 3-16 inches, or 3-12 inches, or 3-8 inches, or 3-6 inches, or 6-24 inches, or 6-16 inches, or 6-12 inches. The person of ordinary skill in the art will appreciate that the various open zones of a given insulation-retaining sheet of the disclosure can have different heights.

The person of ordinary skill in the art, based on the disclosure herein, will select the overall area of the one or more open zones, i.e., as a fraction of area of the insulation-retaining sheet, to provide a desired balance of coverage by vapor-retarding membrane and airflow during blowing in of insulation. In certain embodiments as otherwise described herein, at least 5% (e.g., at least 7%, at least 10%, at least 15%, at least 25% or even at least 35%) of the area of the insulation-retaining sheet is open zones. In certain embodiments as otherwise described herein, no more than 50% (e.g., no more than 40%, no more than 30%, or even no more than 20%) of the area of the insulation-retaining sheet is open zones.

Advantageously, the insulation-retaining sheets of the present disclosure can be made in a variety of heights, suitable for enclosing cavities in variety of sizes of walls, ceilings and floors. For example, in certain embodiments, an insulation-retaining sheet as otherwise described herein has a height (measured from top edge to bottom edge) of at least 48 inches, at least 56 inches, at least 70 inches, or even at least 80 inches. For example, in certain such embodiments, an insulation-retaining sheet as otherwise described herein has a height in the range of 48 inches to 200 inches, e.g., in the range of 48-150 inches, or 48-105 inches, or 48-80 inches, or 56-200 inches, or 56-150 inches, or 56-105 inches, or 56-80 inches, or 70-200 inches, or 70-150 inches, or 70-105 inches, or 80-200 inches, or 80-150 inches, or 80-105 inches. In certain embodiments, the insulation-retaining sheet has a height selected from about 72", about 84", about 96", about 108", about 120", about 132", and about 144".

Similarly, the insulation-retaining sheets of the present disclosure can be made in variety of lengths. Notably, they can be made long enough to span multiple framing members, e.g., multiple rafters, multiple floor joists, or multiple wall studs, and thus can, when installed, enclose a plurality of cavities into which insulation can be filled. For example, in certain embodiments, an insulation-retaining sheet as otherwise described herein has a length (measured from the first side edge to the second side edge) of at least 4 feet, at least 8 feet, at least 12 feet, or even at least 16 feet. In certain such embodiments, an insulation-retaining sheet as otherwise described herein has a length in the range of 4 feet to 300 feet, for example, 4 feet to 150 feet, or 4 feet to 100 feet, or 4 feet to 60 feet, or 4 feet to 40 feet, or 4 feet to 32 feet, or 4 feet to 24 feet, or 4 feet to 16 feet, or 8 feet to 300 feet, or 8 feet to 150 feet, or 8 feet to 100 feet, or 8 feet to 60 feet, or 8 feet to 40 feet, or 8 feet to 32 feet, or 8 feet to 24 feet, or 16 feet to 300 feet, or 16 feet to 150 feet, or 16 feet to 100 feet, or 16 feet to 60 feet, or 16 feet to 40 feet, or 16 feet to 32 feet.

Notably, the insulation-retaining sheet as described herein can be provided in the form of a roll. Because in certain embodiments the insulation-retaining sheet has a substantially uniform cross-section along its length, a roll of material can be provided at any arbitrary length, with desired lengths of material cut to fit a desired building element.

In certain embodiments, an insulation-retaining sheet as otherwise described herein has one or more apertures formed therein. As the person of ordinary skill in the art will appreciate, in many installations it is desirable for the insulation-retaining sheet to have one or more apertures to allow a hose or tube to access the cavity for the purpose of delivering the blown-in insulation. The apertures can be in a variety of shapes, e.g., formed as slits, rectangular holes or rounded holes. In certain embodiments, the one or more apertures have a longest dimension in the range of 1 to 6 inches. When a plurality of apertures are present, they can be provided in with a regular spacing, e.g., on 16 inch centers or on 24 inch centers, to line up with a desired spacing of cavities (e.g., based on stud or rafter spacing).

In certain desirable embodiments, one or more of the apertures (e.g., each of the apertures) are formed in one or more open zones of the insulation-retaining sheets. Advantageously, this avoids forming in the more sensitive vapor-retarding material, and, in many embodiments, the open zone will be covered after installation, so that separately closing or patching the aperture may not be necessary. This can lead to improved vapor permeance performance, as tape or patch material may be relatively impermeable, and can save labor by not requiring a separate aperture patching step. But in other embodiments, one or more of the apertures (e.g., each of the apertures) are formed in areas of the insulation retaining sheet in which vapor-retarding membrane is laminated to the sheet of mesh.

While these apertures can be made at the time of installation, it can in some circumstances be advantageous to provide them as part of the insulation-retaining sheet product itself. Accordingly, in certain embodiments, an insulation-retaining sheet as described herein has the one or more apertures formed therein before it is installed over a building cavity, e.g., during the manufacturing process.

As the person of ordinary skill in the art will appreciate, the insulation-retaining sheets described herein can be useful in the insulation of cavities in buildings, such as in walls, ceilings and floors. For example, a cavity in a wall can be defined between the surfaces of the outer sheeting, an upper plate, a lower plate, and two wall studs. A cavity in a ceiling can be defined between a roof deck, an eave strut, a crest or peak strut, and two adjacent rafters. In all cases, one face of the cavity is closed off by an insulation-retaining sheet according to the disclosure. Accordingly, another aspect of the disclosure is a method of insulating one or more insulation cavities. The method includes providing one or more insulation cavities, e.g., on a wall, a ceiling, or a floor, each of the one or more cavities having an open face defined at least in part by a plurality of building members; substantially enclosing the one or more wall cavities with insulation-retaining sheet as described herein by affixing the insulation-retaining sheet to the plurality of framing members; and blowing insulation into the one or more cavities.

Figure 10:
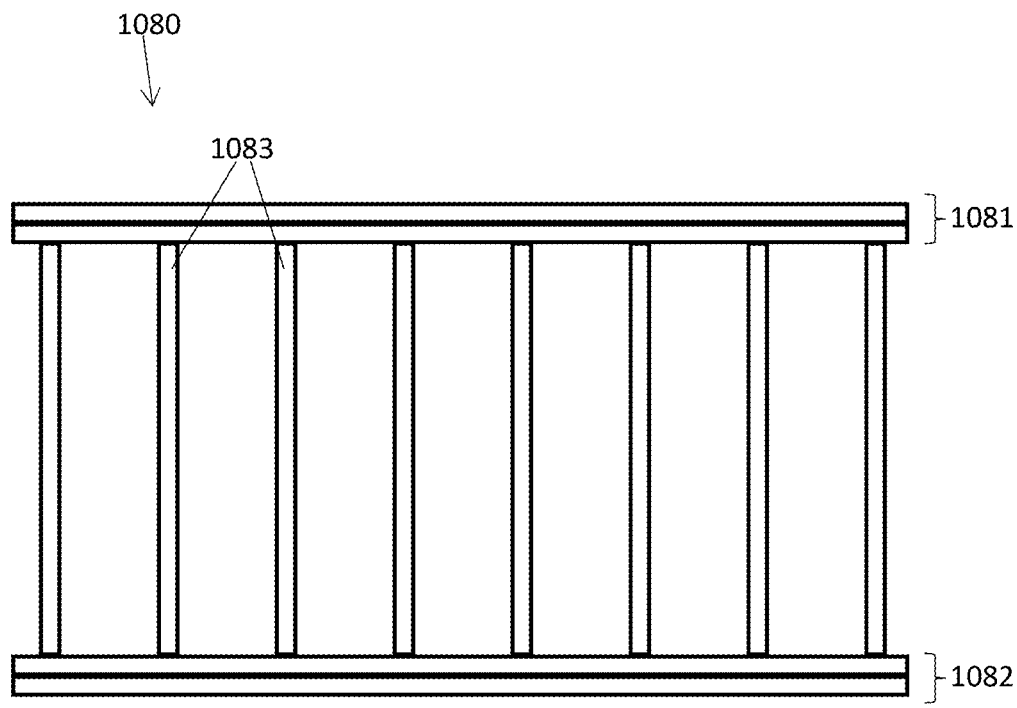
FIG. 10 is a schematic plan view.
Figure 11:
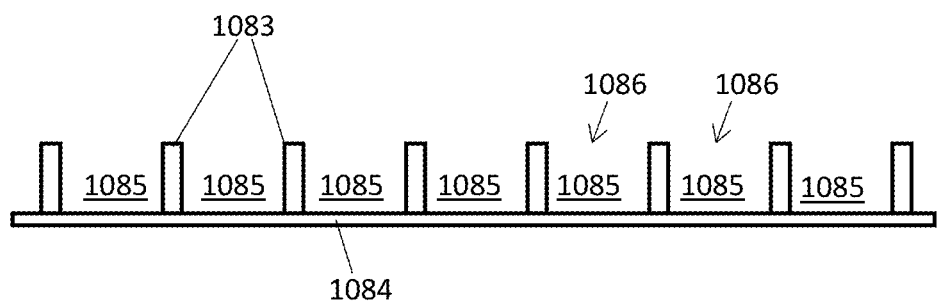
FIG. 11 is a schematic cross-sectional view of a partially-built wall described with respect to a method of one embodiment of the disclosure.

One such embodiment is shown in FIGS. 10-15. FIG. 10 is a schematic plan view, and FIG. 11 is a schematic cross-sectional view of a partially-built wall 1080 having an upper plate 1081, an lower plate 1082, and a plurality of studs 1083. An exterior sheeting 1084 is affixed to the backs of the framing elements. These building elements define a plurality of (here, seven) wall cavities 1085, each having an open face 1086.

Figure 12:
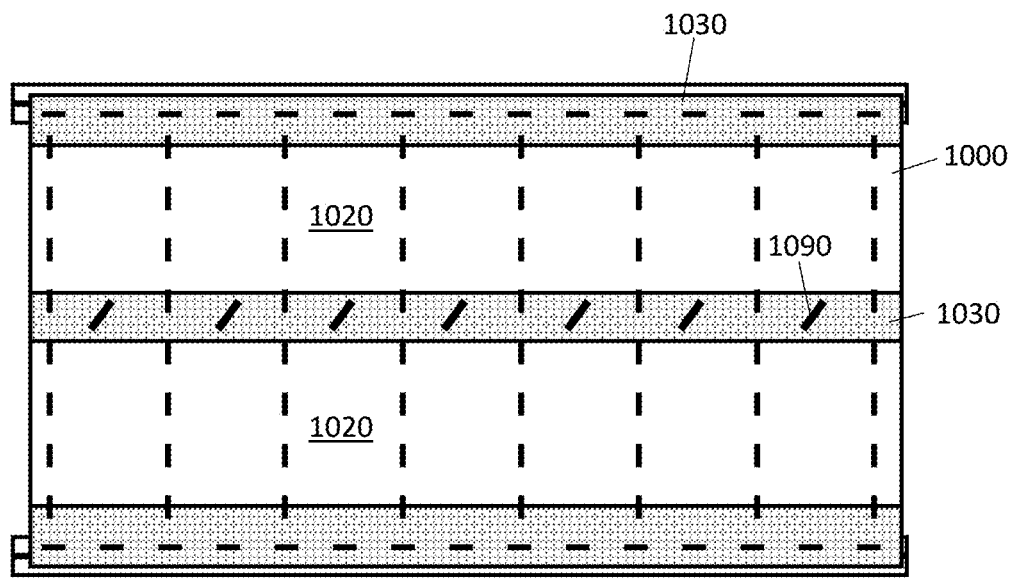
FIG. 12 is a schematic plan view.
Figure 13:
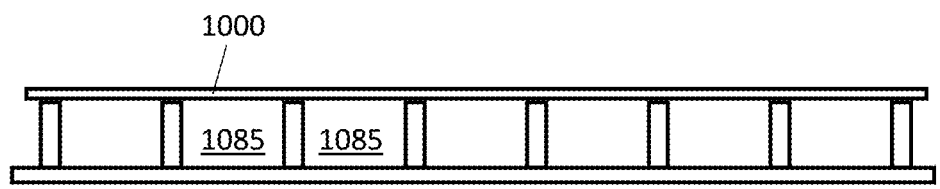
FIG. 13 is a schematic cross-sectional view of a the wall of FIGS. 10 and 11 with an insulation-retaining sheet installed.
Figure 14:
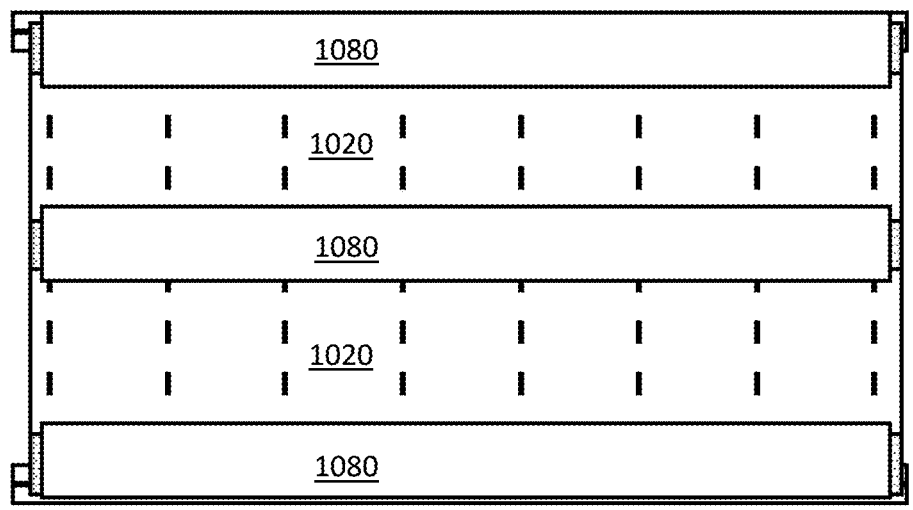
FIG. 14 is a schematic plan view.
Figure 15:
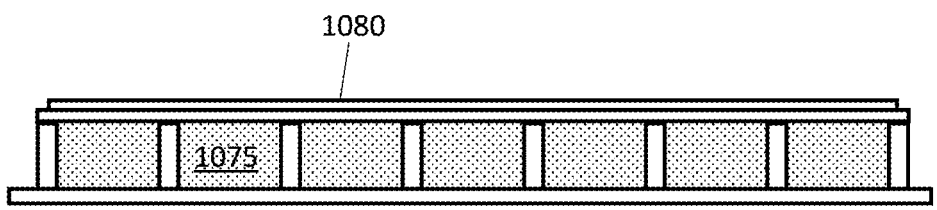
FIG. 15 is a schematic cross-sectional view of a the wall of FIGS. 12 and 13 in which the open zones are covered.

The wall cavities 1085 can then be substantially enclosed with an insulation-retaining sheet as described here, by affixing the insulation-retaining sheet to the building members. FIG. 12 is a schematic plan view, and FIG. 13 is a schematic cross-sectional view of the wall 1080 of FIGS. 10 and 11 with the insulation-retaining sheet 1000 installed. In the embodiment of FIGS. 12 and 13, the insulation-retaining sheet 1000, having strips of vapor retarding material 1020 and open zones 1030, is affixed to substantially all of the building members surrounding the open face of the cavity. In the embodiment shown in FIGS. 12 and 13, staples are used to affix the insulation-retaining sheet; the person of ordinary skill in the art will appreciate that the insulation-retaining sheet can be affixed in many ways, for example, using other fasteners (e.g., nails, tacks or pins) or by use of adhesives, for example, glues, pressure-sensitive adhesives, water-based, solvent based, silicones, acrylics, caulks, etc. Tape can be used to hold the insulation-retaining sheet, for example, temporarily while it is being affixed in some other manner. The insulation-retaining sheet is desirably affixed to the perimeter of the open face sufficiently that blown-in insulation cannot escape from the interface. The person of ordinary skill in the art will use conventional methods for affixing mesh sheets for retaining blown-in insulation in the practice of this step of the method.

Insulation can then be blown into the cavities. The person of ordinary skill in the art can use conventional techniques to blow insulation into the cavities. For example, the insulation can be blown into each of the one or more cavities through an aperture in the insulation-retaining sheet. The person of ordinary skill in the art can form an aperture in the insulation-retaining sheet in each cavity, to provide access for the hose or tube that conducts the blown-in insulation into the cavity. Alternatively, as described above, the insulation-retaining sheet can already be provided with the necessary apertures. Apertures 1090 are shown (in the form of slits) formed in the central open zone, one for each cavity 1085. As described above, during the blowing in of the insulation, pressure can escape each cavity through the one or more open zones. The person of ordinary skill in the art will blow in the insulation at a rate and at a pressure at which the open zone(s) insulation-retaining sheet can effectively allow air to escape to prevent an undesirable degree of pressure buildup.

In certain desirable embodiments, one or more of (e.g., each of) the open zones are covered after the blowing in of insulation. For example, in certain embodiments, one or more of the open zones (e.g., each open zone) is covered with an adhesive tape. In certain embodiments, one or more of the open zones is covered with a separate strip of vapor-retarding membrane, which can be the same or different type of membrane as that of the insulation-retaining sheet. This is shown in the respective schematic plan and schematic cross-sectional views of FIGS. 14 and 15. Here, after insulation 1075 is blown in, separate strips of vapor-retarding membrane 1080 are affixed to the insulation-retaining sheet to cover the open zones 1030. As the person of ordinary skill in the art will appreciate, the separate strip(s) of vapor-retarding membrane can be affixed in a variety of ways. For example, fasteners can be used, such as staples, nails, tacks and pins (e.g., into framing members). A variety of adhesives can also or alternatively be used, for example, glues, pressure-sensitive adhesives, water-based, solvent based, silicones, acrylics, caulks, etc. Tape can be used to hold strip(s) of vapor-retarding membrane, either temporarily (e.g., while being affixed in some other manner) or permanently. And the person of ordinary skill in the art will appreciate that other materials, such as vapor blocking membrane, kraft paper, or other sheet materials can be used to cover the open zone(s); the person of ordinary skill in the art will understand how the vapor permeance performance of the overall wall will vary depending on the different materials used. In certain such embodiments, no separate patching, taping, or otherwise sealing of the aperture is necessary, as described above.

While covering the open zones with separate strips of material does represent another installation step, strips of material are much easier for a single installer to handle than are sheets the size of an entire wall or ceiling section. Accordingly, use of the insulation-retaining sheet as described herein represents a significant simplification of a method for installing an insulated cavity.

And, as described above, when the insulation-retaining sheet includes one or more flaps, the covering of the open zone(s) can be performed by affixing the flaps, either to the underlying sheet of mesh or to a neighboring strip of vapor-retarding membrane, to cover one or more of the open zones, as described above. Here, too, the flaps can be affixed in a variety of manners. For example, fasteners can be used, such as staples, nails, tacks and pins (e.g., into framing members). A variety of adhesives can also or alternatively be used, for example, glues, pressure-sensitive adhesives, water-based, solvent based, silicones, acrylics, caulks, etc. Tape can be used to hold flaps, either temporarily (e.g., while being affixed in some other manner) or permanently. While this, too, represents another installation step, as the flaps are already substantially in position, it is simple to affix them to cover the open zones. Accordingly, use of the insulation-retaining sheet as described herein represents a significant simplification of a method for installing an insulated cavity.

Any aperture(s) in the insulation-retaining sheet can be closed, e.g., with a patch of sheet material or with an adhesive tape. The person of ordinary skill in the art can use conventional techniques to close any such apertures. Or, as otherwise described herein, the material used to close the open zones can be sufficient to close the aperture(s).

As the person of ordinary skill in the art will appreciate based on the present disclosure, the covering of the open zone(s) and/or the closing of any apertures can be performed to provide the insulation-retaining sheet with substantial airtightness, so that it can help to provide a wall or other building element with substantial airtightness. For example, the person of ordinary skill in the art can use tape, caulk, or adhesives in the covering of the open zone(s) and/or close any apertures in order to substantially improve the airtightness. The insulation-retaining sheet can therefore act as an air barrier to impart substantial airtightness to an insulated building cavity. Thus, the insulation-retaining sheets described herein can help an installer to meet the higher requirements of some building codes for both air tightness and energy efficiency, including the especially stringent requirements of building codes in areas such as in Europe and Canada.

While the description above focuses on wall cavities, the person of ordinary skill in the art will appreciate that other building cavities such as floor cavities and ceiling cavities can be treated similarly. Thus, the insulation-retaining sheets described herein can also be applied to the undersides of ceilings or floors, in attic truss and joist areas, below beams, to the top of studs mounted on slabs or floors, among other geometries. In such cases, the insulation-retaining sheets can be installed substantially horizontally, above or below a cavity (i.e., depending on whether the cavity is part of a floor or a ceiling). Moreover, while the description with reference to the figures focuses on wall cavities that have their longer dimension extending vertically, the person of ordinary skill in the art will appreciate that in some embodiments a wall cavity can be longer in a horizontal dimension than in a vertical.

Moreover, the insulation-retaining sheets can be used in the construction of prefabricated building panels, i.e., not already part of a building structure. In such cases, the cavity can be oriented in any convenient direction for fabrication, for example, horizontally (i.e., with panel laying on a horizontal surface, e.g., of a conveyor belt), or vertically (i.e., with the panel held upright during the filling process).

Figure 16:
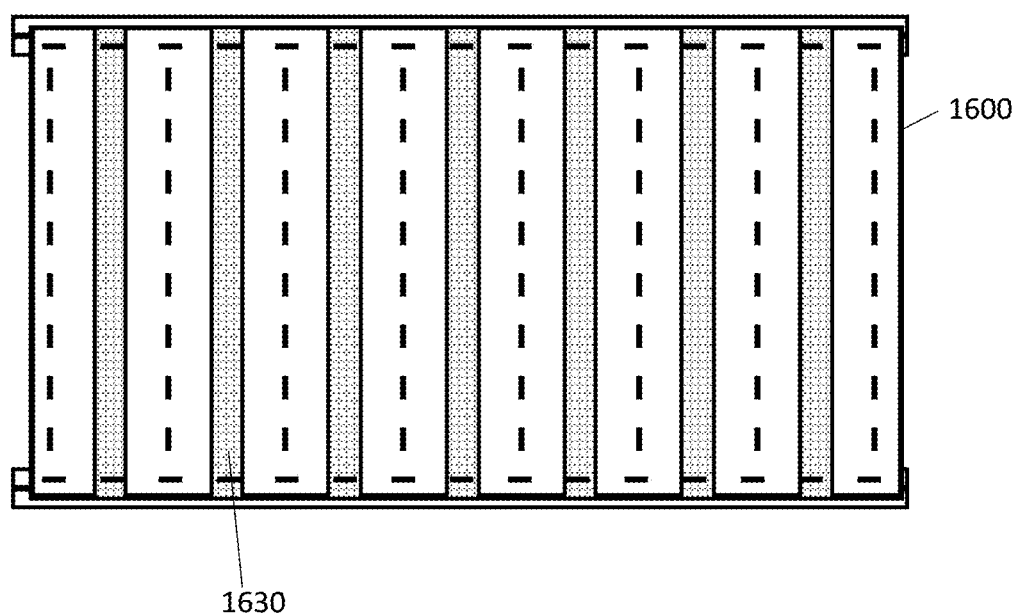
FIG. 16 is a schematic plan view of a building cavity with an insulation-retaining sheet installed thereon, according to one embodiment of the disclosure.

Moreover, in various embodiments otherwise described herein, the insulation-retaining sheet is installed against a building cavity such that the open zone(s) are oriented horizontally with respect to the building, e.g., with the open zone(s) running across multiple building cavities. However, notwithstanding the fact that the insulation-retaining sheet is described herein as having a "top edge" and a "bottom edge," the insulation-retaining sheets can in other embodiments be installed against a building cavity such that the open zone(s) are oriented vertically with respect to the building. In certain desirable such embodiments, each building cavity over which the insulation retaining sheet has at least part of at least one open zone disposed over it. One example is shown in schematic plan view in FIG. 16. The wall cavities (similar to those of FIGS. 12 and 13) can be substantially enclosed with an insulation-retaining sheet 1600 as described here, by affixing the insulation-retaining sheet to the building members. In the embodiment of FIG. 16, the insulation-retaining sheet 1600, having open zones 1630, is affixed to substantially all of the building members surrounding the open face of the cavity, such that at least one open zone is disposed over each cavity. Notably, in this embodiment, the open zones of the insulation-retaining sheet 1600 run vertically with respect to the wall. Accordingly, the "top edge" and the "bottom edge" of the insulation-retaining sheet are disposed at the left and right sides of the wall section in the figure, while the first and second side edges are disposed at the top and bottom sides of the wall section in the figure.

Another aspect of the disclosure is an insulated building cavity. The insulated building cavity includes a cavity closed off on one face by an insulation-retaining sheet as described herein, and loose-fill insulation disposed in the cavity. In certain such embodiments, each of one or more of the open zones (e.g., each of the open zones) of the insulation-retaining sheet is covered, e.g., by a flap, by a separate strip of material, by a separate strip of insulating material, or by a strip of adhesive tape. The insulated building cavity can be substantially as described above with respect to the methods of insulation.

FIGS. 17-19 are three examples of particular designs of insulation-retaining sheets according to the disclosure. Both of these sheets are configured to have one or more flaps, as described above. [In the embodiment of FIG. 17, four strips of vapor-retarding membrane, here, MemBrain™ brand vapor-retarding membrane, are laminated to the sheet of mesh, here, OPTIMA® brand insulation retaining fabric. The top three strips are configured as "first strips" as described above, each having a top zone laminated to the sheet of mesh and a bottom zone not affixed to the sheet of mesh and forming a flap. The bottom strip is configured as a "second strip" as described above, completely laminated to the sheet of mesh. In the embodiment of FIG. 18, there are only two strips of material; the top one acting as a "first strip" and forming a flap, and the bottom one acting as a "second strip." In the embodiment of FIG. 19, there is only one strip of material, acting as a "first strip." This configuration is shorter than most conventional walls; it can be used in combination with a separate vapor-retarding membrane to seal off a wall cavity.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

Additional embodiments of the disclosure are provided below as enumerated embodiments. These embodiments may be combined in any not logically-inconsistent manner, as indicated.

Embodiment 1

An insulation-retaining sheet having a top edge and an opposed bottom edge, and a first side edge and an opposed second side edge, the insulation-retaining sheet comprising:
  a sheet of mesh having an air permeability of at least 200 cfm per square foot, a top edge and an opposed bottom edge, and a first side edge and an opposed second side edge; and
  one or more strips of vapor-retarding membrane, each of the one or more strips of vapor retarding membrane each having a top edge and an opposed bottom edge, and a first side edge and an opposed second side edge, the one or more strips of vapor-retarding membrane being laminated to the sheet of mesh, the first side edge each of the strips of vapor-retarding membrane extending to the first side edge of the sheet of mesh, the second side edge each of the strips of vapor-retarding membrane extending to the second side edge of the sheet of mesh,
  wherein the insulation-retaining sheet has a plurality of open zones extending laterally from the first side edge of the sheet of mesh to the second side edge of the sheet of mesh in which no vapor-retarding membrane is laminated to the mesh.

Embodiment 2

The insulation-retaining sheet according to Embodiment 1, wherein the sheet of mesh has an air permeability of at least 300 cfm per square foot, e.g., at least 350 cfm per square foot, at least 400 cfm per square foot, or even at least 450 cfm per square foot.

Embodiment 3

The insulation-retaining sheet according to Embodiment 1 or Embodiment 2, wherein the mesh is a fabric mesh.

Embodiment 4

The insulation-retaining sheet according to Embodiment 1 or Embodiment 2, wherein the mesh is a non-woven fabric mesh.

Embodiment 5

The insulation-retaining sheet according to any of Embodiments 1-4, wherein the vapor-retarding membrane has a water vapor permeance of no more than about 1 Perm at 25% relative humidity, as tested by ASTM E96 at 23° C.

Embodiment 6

The insulation-retaining sheet according to any of Embodiments 1-5, wherein the vapor-retarding membrane has a water vapor permeance in the range of at least 2 perms, e.g., 4-15 perms, e.g., in the range of 6-12 perms at 75% relative humidity as tested by ASTM E96 at 23° C.

Embodiment 7

The insulation-retaining sheet according to any of Embodiments 1-6, wherein the vapor retarding membrane has one or more of a) a water vapor permeance of no more than 5 perms, e.g., no more than 2.5 perms or less at 45% relative humidity, and b) a water vapor permeance of at least about 5 Perms (e.g., at least about 8 Perms, or at least about 12 Perms, or at least about 15 Perms, or at least about 20 Perms) at 95% relative humidity, both as tested by ASTM E96 at 23° C.

Embodiment 8

The insulation-retaining sheet according to any of Embodiments 1-7, wherein the vapor-retarding membrane is a polymer sheet, e.g., of polyethylene, polypropylene, nylon (e.g., nylon-6) or poly(vinyl chloride).

Embodiment 9

The insulation-retaining sheet according to any of Embodiments 1-7, wherein the vapor-retarding membrane comprises a sheet (e.g., a non-woven fabric) having a vapor-retarding coating formed thereon.

Embodiment 10

The insulation-retaining sheet according to any of Embodiments 1-7, wherein the vapor-retarding membrane is a polymer laminate.

Embodiment 11

The insulation-retaining sheet according to any of Embodiments 1-10, comprising a plurality of the strips of vapor-retarding membrane.

Embodiment 12

The insulation-retaining sheet according to any of Embodiments 1-10, comprising in the range of 2-10 strips of vapor-retarding membrane, e.g., in the range of 2-8, or 2-6, or 2-4, or 3-10, or 3-8, or 3-6, or 5-10, or 5-8.

Embodiment 13

The insulation-retaining sheet according to any of Embodiments 1-10, comprising a single strip of vapor-retarding membrane.

Embodiment 14

The insulation-retaining sheet according to any of Embodiments 1-13, wherein the one or more open zones include a top open zone extending along the top edge of the insulation-retaining membrane and a bottom open zone extending along the bottom edge of the insulation-retaining membrane.

Embodiment 15

The insulation-retaining sheet according to any of Embodiments 1-14, wherein the one or more open zones include one or more interior open zones extending across the sheet of mesh between its top edge and its bottom edge.

Embodiment 16

The insulation-retaining sheet according to any of Embodiments 1-15, having 2-11 open zones.

Embodiment 17

The insulation-retaining sheet according to any Embodiments claims 1-15, having a number of open zones in the range of 2-9, or 2-7, or 2-5, or 3-11, or 3-9, or 3-7, or 5-11, or 5-9.

Embodiment 18

The insulation-retaining sheet according to any of Embodiments 1-15, having two open zones, or three open zones, or four open zones.

Embodiment 19

The insulation-retaining sheet according to any of Embodiments 1-18, wherein each of the strips of vapor-retarding membrane is laminated to the sheet of mesh substantially throughout its height.

Embodiment 20

The insulation-retaining sheet according to any of Embodiments 1-19, wherein the one or more strips of vapor retarding membrane comprise one or more first strips of vapor retarding membrane, each having a top zone in a top-most portion of the first strip, the top zone extending from the first side edge to the second side edge of the first strip, the top zone being laminated to the sheet of mesh, and a bottom zone in a bottom-most portion of the first strip adjacent the top portion of the first strip, the bottom zone extending from the first side edge to the second side edge of the first strip, the bottom zone not being affixed to the sheet of mesh, the bottom zone forming a flap having a bottom edge, a first side edge and an opposed second side edge.

Embodiment 21

The insulation-retaining sheet according to Embodiment 20, wherein the one or more strips of vapor retarding membrane further comprise one or more second strips of vapor-retarding membrane, each of the one or more second strips of vapor retarding membrane, each of the one or more second strips of vapor retarding membrane being laminated to the sheet of mesh substantially throughout its height.

Embodiment 22

The insulation-retaining sheet according to Embodiment 20 or Embodiment 21, wherein one or more of the flaps (e.g., each of the one or more flaps) substantially covers the open zone defined thereby Embodiment 23

The insulation-retaining sheet according to any of Embodiments 20-22, wherein one or more of the flaps (e.g., each of the one of more flaps) substantially overlaps a neighboring strip of vapor-retarding membrane.

Embodiment 24

The insulation-retaining sheet according to Embodiment 23, wherein each of the overlapping flaps has a strip of adhesive (e.g., with a removable liner) disposed along its bottom edge facing the sheet of mesh.

Embodiment 25

The insulation-retaining sheet according to any of Embodiments 20-24, wherein in each first strip, the height of the top zone is at least the height of the bottom zone, e.g., at least 1.5 times, at least 2 times, or at least 3 times the height of the bottom zone.

Embodiment 26

The insulation-retaining sheet according to any of Embodiments 20-25, wherein in each first strip, the height of the top zone is no more than 20 times the height of the bottom zone, e.g., no more than 15 times, or no more than 10 times the height of the bottom zone.

Embodiment 27

The insulation-retaining sheet according to any of Embodiments 20-26, wherein in each first strip of material, the bottom zone is at least 2 inches in height, e.g., at least 4 inches, at least 8 inches, or in the range of 2-25 inches, or 2-16 inches, or 4-25 inches, or 4-16 inches, or 8-25 inches, or 8-16 inches in height.

Embodiment 28

The insulation-retaining sheet according to any of Embodiments 1-27, wherein each of the strips of vapor retarding membrane has a height of at least 4 inches, at least 8 inches, at least 15 inches, or even at least 25 inches.

Embodiment 29

The insulation-retaining sheet according to any of Embodiments 1-27, wherein each of the strips of vapor retarding membrane has a height in the range of 4 inches to 180 inches, e.g., in the range of 4-160 inches, or 4-128 inches, or 4-104 inches, or 4-76 inches, or 4-66 inches, or 4-54 inches, or 4-42 inches, or 4-30 inches, or 8-180 inches, or 8-160 inches, or 8-128 inches, or 8-104 inches, or 8-76 inches, or 8-66 inches, or 8-54 inches, or 8-42 inches, or 8-30 inches, or 18-180 inches, or 18-160 inches, or 18-128 inches, or 18-104 inches, or 18-76 inches, or 18-66 inches, or 18-54 inches, or 18-42 inches, or 30-180 inches, or 30-160 inches, or 30-128 inches, or 30-104 inches, or 30-76 inches, or 30-66 inches, or 30-54 inches, or 30-42 inches, or 42-180 inches, or 42-160 inches, or 42-128 inches, or 42-104 inches, or 42-76 inches, or 42-66 inches, or 42-54 inches, or 54-180 inches, or 54-160 inches, or 54-128 inches, or 54-104 inches, or 54-76 inches, or 54-66 inches, or 66-180 inches, or 66-160 inches, or 66-128 inches, or 66-104 inches, or 66-76 inches, or 76-180 inches, or 76-160 inches, or 76-128 inches, or 76-104 inches.

Embodiment 30

The insulation-retaining sheet according to any of Embodiments 1-29, wherein each of the open zones has a height in the range of 1-24 inches.

Embodiment 31

The insulation-retaining sheet according to any of Embodiments 1-30, wherein each of the open zones has a height in the range of 1-16 inches, or 1-12 inches, or 1-8 inches, or 1-6 inches, or 1-4 inches, or 2-24 inches, or 2-16 inches, or 2-12 inches, or 2-8 inches, or 2-6 inches, or 2-4 inches, or 3-24 inches, or 3-16 inches, or 3-12 inches, or 3-8 inches, or 3-6 inches, or 6-24 inches, or 6-16 inches, or 6-12 inches.

Embodiment 32

The insulation-retaining sheet according to any of Embodiments 1-31, wherein at least 5% of the area of the insulation-retaining sheet is open zones.

Embodiment 33

The insulation-retaining sheet according to any of Embodiments 1-31, wherein at least 10% of the area of the insulation-retaining sheet is open zones.

Embodiment 34

The insulation-retaining sheet according to any of Embodiments 1-31, wherein at least 15% of the area of the insulation-retaining sheet is open zones.

Embodiment 35

The insulation-retaining sheet according to any of Embodiments 1-34, wherein no more than 30% of the area of the insulation-retaining sheet is open zones.

Embodiment 36

The insulation-retaining sheet according to any of Embodiments 1-34, wherein no more than 25% of the area of the insulation-retaining sheet is open zones.

Embodiment 37

The insulation-retaining sheet according to any of Embodiments 1-34, wherein no more than 20% of the area of the insulation-retaining sheet is open zones.

Embodiment 38

The insulation-retaining sheet according to any of Embodiments 1-37, having a height of at least 48 inches, for example, at least 56 inches, at least 70 inches, or at least 85 inches.

Embodiment 39

The insulation-retaining sheet according to any of Embodiments 1-37, having a height in the range of 48 inches to 200 inches, e.g., in the range of 48-150 inches, or 48-105 inches, or 48-80 inches, or 56-200 inches, or 56-150 inches, or 56-105 inches, or 56-80 inches, or 70-200 inches, or 70-150 inches, or 70-105 inches, or 85-200 inches, or 85-150 inches, or 85-105 inches.

Embodiment 40

The insulation-retaining sheet according to any of Embodiments 1-39, having a length in the range of at least 4 feet, at least 8 feet, at least 12 feet, or even at least 16 feet.

Embodiment 41

The insulation-retaining sheet according to any of Embodiments 1-40, having a length in the range of 4 feet to 300 feet.

Embodiment 42

The insulation-retaining sheet according to any of Embodiments 1-40, having a length in the range of 4 feet to 150 feet, or 4 feet to 100 feet, or 4 feet to 60 feet, or 4 feet to 40 feet, or 4 feet to 32 feet, or 4 feet to 24 feet, or 4 feet to 16 feet, or 8 feet to 300 feet, or 8 feet to 150 feet, or 8 feet to 100 feet, or 8 feet to 60 feet, or 8 feet to 40 feet, or 8 feet to 32 feet, or 8 feet to 24 feet, or 16 feet to 300 feet, or 16 feet to 150 feet, or 16 feet to 100 feet, or 16 feet to 60 feet, or 16 feet to 40 feet, or 16 feet to 32 feet.

Embodiment 43

The insulation-retaining sheet according to any of Embodiments 1-42, in the form of a roll.

Embodiment 44

The insulation-retaining sheet according to any of Embodiments 1-43, wherein the insulation-retaining sheet has one or more apertures formed therein.

Embodiment 45

The insulation-retaining sheet according to Embodiment 45, wherein the one or more apertures have a longest dimension in the range of 1 inch to 6 inches.

Embodiment 46

The insulation-retaining sheet according to Embodiment 44 or Embodiment 45, having a plurality of apertures along the length of the sheet, e.g., on 16 inch centers or on 24 inch centers.

Embodiment 47

A method of insulating one or more building cavities, the method comprising:
providing one or more insulation cavities, each having an open face defined at least in part by a plurality of building members;
substantially enclosing the one or more insulation cavities with an insulation-retaining sheet according to any of Embodiments 1-46 by affixing the insulation-retaining sheet to the plurality of building members; and
blowing insulation into the one or more cavities.

Embodiment 48

The method of Embodiment 47, wherein the insulation is blown into each of the one or more cavities through an aperture in the insulation-retaining sheet.

Embodiment 49

The method of Embodiment 47 or Embodiment 48, wherein the method further comprises, after blowing the insulation into the one or more cavities, covering one or more of (e.g., each of) the open zones.

Embodiment 50

The method of Embodiment 49, wherein each of one or more of the open zones is covered by an adhesive tape.

Embodiment 51

The method of Embodiment 49 or Embodiment 50, wherein each of one or more of the open zones is covered by a separate strip of vapor-retarding membrane.

Embodiment 52

The method of any of Embodiments 49-51, wherein each of one or more of the open zones is covered by a separate strip of material.

Embodiment 53

The method of any of Embodiments 49-52, wherein the insulation retaining sheet is an insulation-retaining sheet according to any of Embodiments 20-27, and wherein the method further includes affixing the one or more flaps so as to cover one or more of the open zones.

Embodiment 54

The method of any of Embodiments 49-53, wherein the covering of the one or more open zones is performed using one or more of tape, caulk and adhesive so as to substantially seal them.

Embodiment 55

The method of any of Embodiments 49-54, wherein the insulating retaining sheet substantially improves the airtightness of the insulated cavity.

Embodiment 56

The method of any of Embodiments 49-55, further comprising installing a wallboard over the insulated cavity.

Embodiment 57

An insulated building cavity, the insulated building cavity comprising
a cavity closed off on one face by an insulation-retaining sheet according to any of Embodiments 1-46; and
loose-fill insulation disposed in the cavity.

Embodiment 58

The insulated building cavity according to Embodiment 57, wherein each of one or more of the open zones of the insulation-retaining sheet is covered, e.g., by a flap, by a separate strip of material, by a separate strip of insulating material, or by a strip of adhesive tape.

Embodiment 59

The insulated building cavity according to Embodiment 58, wherein the insulation-retaining sheet acts as an air barrier and imparts substantial airtightness to the insulated building cavity.

What is claimed is:

1. An insulation-retaining sheet having a top edge and an opposed bottom edge, and a first side edge and an opposed second side edge, the insulation-retaining sheet comprising:
   a sheet of mesh having an air permeability of at least 200 cfm per square foot, a top edge and an opposed bottom edge, and a first side edge and an opposed second side edge; and
   one or more strips of vapor-retarding membrane, each of the one or more strips of vapor retarding membrane each having a top edge and an opposed bottom edge, and a first side edge and an opposed second side edge, the one or more strips of vapor-retarding membrane being laminated to the sheet of mesh, the first side edge each of the strips of vapor-retarding membrane extending to the first side edge of the sheet of mesh, the second side edge each of the strips of vapor-retarding membrane extending to the second side edge of the sheet of mesh,
   wherein the insulation-retaining sheet has a plurality of open zones extending laterally from the first side edge of the sheet of mesh to the second side edge of the sheet of mesh in which no vapor-retarding membrane is laminated to the mesh, and
   wherein the one or more strips of vapor retarding membrane comprise one or more first strips of vapor retarding membrane, each having
      a first zone extending from the first side edge to the second side edge of the first strip, the first zone being laminated to the sheet of mesh, and
      a second zone adjacent the first zone, the second zone extending from the first side edge to the second side edge of the first strip, the second zone not being affixed to the sheet of mesh, the second zone forming a flap having a laterally-extending edge, a first side edge and an opposed second side edge, wherein the second zone is configured to cover an open zone of the insulation-retaining sheet.

2. The insulation-retaining sheet according to claim 1, wherein the mesh is a fabric mesh.

3. The insulation-retaining sheet according to claim 1, wherein the vapor-retarding membrane has a water vapor permeance of no more than about 1 Perm at 25% relative humidity, as tested by ASTM E96 at 23° C., and a water vapor permeance of at least 2 perms at 75% relative humidity as tested by ASTM E96 at 23° C.

4. The insulation-retaining sheet according to claim 1, wherein the vapor retarding membrane has one or more of a) a water vapor permeance of no more than 5 perms at 45% relative humidity, and b) a water vapor permeance of at least about 5 Perms at 95% relative humidity, both as tested by ASTM E96 at 23° C.

5. The insulation-retaining sheet according to claim 1, wherein the vapor-retarding membrane is a polymer sheet, a polymer laminate, or comprises a sheet having a vapor-retarding coating formed thereon.

6. The insulation-retaining sheet according to claim 1, comprising in the range of 2-10 strips of vapor-retarding membrane.

7. The insulation-retaining sheet according to claim 1, wherein the plurality of open zones include a top open zone extending along the top edge of the insulation-retaining membrane and a bottom open zone extending along the bottom edge of the insulation-retaining membrane.

8. The insulation-retaining sheet according to claim 1, wherein the plurality of open zones include one or more interior open zones extending across the sheet of mesh between its top edge and its bottom edge.

9. The insulation-retaining sheet according to claim 1, wherein each of the strips of vapor-retarding membrane is laminated to the sheet of mesh substantially throughout its height.

10. The insulation-retaining sheet according to claim 1, wherein in the one or more first strips of vapor retarding membrane, the first zone is a top zone in a top-most portion of the first strip, and the second zone is a bottom zone in a bottom-most portion of the first strip adjacent the top-most portion of the first strip.

11. The insulation-retaining sheet according to claim 1, wherein each of the strips of vapor retarding membrane has a height of at least 15 inches.

12. The insulation-retaining sheet according to claim 1, wherein each of the open zones has a height in the range of 1-24 inches.

13. The insulation-retaining sheet according to claim 1, wherein at least 5% of the area of the insulation-retaining sheet is open zones.

14. The insulation-retaining sheet according to claim 13, wherein no more than 30% of the area of the insulation-retaining sheet is open zones.

15. The insulation-retaining sheet according to claim 1, wherein the insulation-retaining sheet has one or more apertures formed therein.

16. A method of insulating one or more building cavities, the method comprising:
providing one or more building cavities, each having an open face defined at least in part by a plurality of building members;
substantially enclosing the one or more building cavities with an insulation-retaining sheet according to claim 1 by affixing the insulation-retaining sheet to the plurality of building members; and
blowing insulation into the one or more building cavities such that the insulation is retained in the cavity by the insulation-retaining sheet.

17. The method of claim 16, wherein the insulation is blown into each of the one or more cavities through an aperture in the insulation-retaining sheet.

18. The method of claim 16, wherein the method further comprises, after blowing the insulation into the one or more cavities, covering each of one or more of the open zones with a flap of one of the first strips of vapor-retarding membrane.

19. An insulated building cavity, the insulated building cavity comprising
a building cavity closed off on one face by an insulation-retaining sheet according to claim 1; and
loose-fill insulation disposed in the building cavity and retained in the building cavity by the insulation-retaining sheet.

20. The insulated building cavity of claim 19, wherein each of one or more of the open zones is covered by a flap of one of the first strips of vapor-retarding membrane.

* * * * *